（12）United States Patent
Raju

(10) Patent No.: US 11,947,493 B2
(45) Date of Patent: Apr. 2, 2024

(54) TECHNIQUES FOR ARCHIVED LOG DELETION

(71) Applicant: Rubrik, Inc., Palo Alto, CA (US)

(72) Inventor: Pandian Raju, Sunnyvale, CA (US)

(73) Assignee: Rubrik, Inc., Palo Alto, CA (US)

( * ) Notice: Subject to any disclaimer, the term of this patent is extended or adjusted under 35 U.S.C. 154(b) by 52 days.

(21) Appl. No.: 17/696,665

(22) Filed: Mar. 16, 2022

(65) Prior Publication Data

US 2023/0297547 A1    Sep. 21, 2023

(51) Int. Cl.
*G06F 16/17* (2019.01)
*G06F 11/14* (2006.01)
*G06F 16/14* (2019.01)
*G06F 16/16* (2019.01)

(52) U.S. Cl.
CPC ...... *G06F 16/1734* (2019.01); *G06F 11/1464* (2013.01); *G06F 11/1469* (2013.01); *G06F 16/14* (2019.01); *G06F 16/162* (2019.01); *G06F 2201/80* (2013.01)

(58) Field of Classification Search
CPC ............. G06F 16/1734; G06F 11/1464; G06F 11/1469; G06F 16/14; G06F 16/162; G06F 2201/80
See application file for complete search history.

(56) References Cited

U.S. PATENT DOCUMENTS

2017/0091256 A1* 3/2017 Gordon .................. G06F 16/93
2020/0319976 A1* 10/2020 Shu ..................... G06F 11/1453
2021/0096957 A1* 4/2021 Rahman ............. G06F 11/1471

* cited by examiner

*Primary Examiner* — Etienne P Leroux
*Assistant Examiner* — Cindy Nguyen
(74) *Attorney, Agent, or Firm* — Holland & Hart LLP

(57) ABSTRACT

During a backup a procedure, a first storage entity may backup a set of database logs from a second storage entity and metadata associated with the set of database logs may be stored in a log deletion table. In accordance with a user configuration of the second storage entity and the backup procedure, a first command to delete one or more database logs of the set from the second storage entity may be transmitted to the second storage entity. The log deletion table may be updated based on a query of second storage entity about whether the one or more database logs were deleted from the second storage entity in response to the first command. Based on the updated log deletion table, a second command may be transmitted to the second storage entity to delete database logs that were not deleted in response to the first command.

29 Claims, 13 Drawing Sheets

Log Deletion Table 505

| Database ID | Row ID | State ID | Time Period | Metadata |
|---|---|---|---|---|
| D1 | R1 | S1 | T1 | M1 |
| D1 | R2 | S2 | T2 | M2 |
| D2 | R3 | S3 | T3 | M3 |
| ... | ... | ... | ... | ... |
| D$n$ | R$n$ | S$n$ | T$n$ | M$n$ |

TECHNIQUES FOR ARCHIVED LOG DELETION

FIELD OF TECHNOLOGY

The present disclosure relates generally to database systems and data processing, and more specifically to techniques for archived log deletion.

BACKGROUND

A computing system may be employed to manage, process, backup, and restore data using a network of computing devices.

Some data management systems may support the backing up of databases stored at a host such that restoration of the databases is possible. To support restoration of a database, a data management system may backup transaction logs generated and stored at the host that track updates made to the database. To free storage space at the host, the transaction logs may be deleted from the host based on being backed up. In some cases, however, the transaction logs may fail to be deleted from the host and may remain stored on the host as a result, thereby occupying storage space at the host with backed up (e.g., redundant) information and reducing storage space available at the host.

BRIEF DESCRIPTION OF THE DRAWINGS

FIG. 5 illustrates an example of a metadata diagram that supports techniques for archived log deletion in accordance with aspects of the present disclosure.

DETAILED DESCRIPTION

Figure 1:
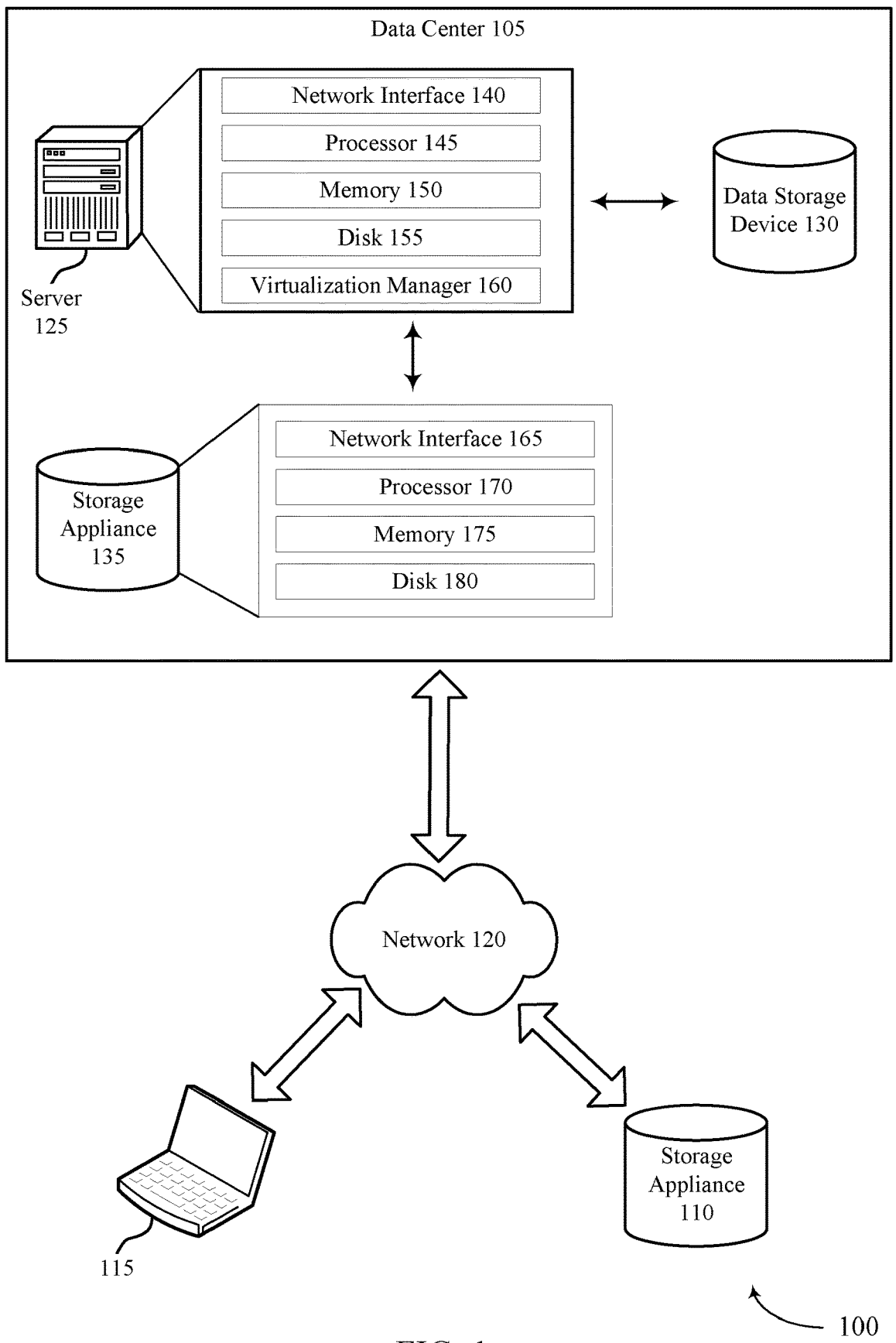
FIG. 1 illustrates an example of a computing environment that supports techniques for archived log deletion in accordance with aspects of the present disclosure.

Some computing systems (e.g., cloud data storage services) may support the backing up and restoration (e.g., recovery) of databases across storage entities. For example, a first storage entity (e.g., a storage appliance, a server, a server cluster) may be configured to backup databases stored at a second storage entity (e.g., a storage appliance, a server, a computing device, a host device) such that the databases may be deleted from the second storage entity and restored (e.g., in part) to the second storage entity. To support restoration of a database to the second storage entity, the first storage entity may backup database logs generated and stored at the second storage entity that track updates made to the database. To free space at the second storage entity, the database logs may be deleted from the second storage entity at some time after being backed up to the first storage entity (e.g., immediately, or after a configured retention period).

In some cases, however, one or more of the database logs may fail to be deleted from the second storage entity, for example, due to network connection errors during attempted deletion of the database logs, errors in running a log deletion script, or failure of the database logs to be replicated to a standby server prior to the deletion attempt, among other examples. As a result, the database logs may remain stored at the second storage entity, thereby occupying storage space at the second storage entity with redundant database logs, reducing storage space available at the second storage entity for other information (e.g., other database logs, other databases, etc.), or necessitating manual deletion of the remaining database logs by a user of the second storage entity.

Techniques, systems, and devices are described herein to enable the deletion of database logs that failed to be deleted from a storage entity. For example, a log deletion table may be implemented to track which database logs are yet to be deleted from the storage entity, which may enable the reissuing of commands to delete database logs that failed to be deleted. For instance, a first storage entity may store a set of database logs as part of a backup procedure for backing up the set of database logs from a second storage entity to the first storage entity. As part of the backup procedure, an entity (e.g., the first storage entity, another storage entity) may store metadata associated with the set of database logs in a log deletion table. In accordance with the backup procedure, the entity may be configured to issue a command to the second storage entity to delete one or more of the set of database logs from the second storage entity. Thus, in accordance with a user configuration of the second storage entity (e.g., after expiration of a configured retention period), the entity may transmit a first command to the second storage entity to delete the one or more database logs.

In some examples, one or more of the database logs may fail to be deleted from the second storage entity in response to the first command. Accordingly, the entity may query the second storage entity about whether the one or more database logs were deleted in response to the first command, and the second storage entity may indicate which database logs were deleted, which database logs were not deleted, or both, in response to the query. The entity may update the log deletion table based on the query, for example, by deleting metadata from the log deletion table that is associated with the database logs that were deleted in response to the first command, maintaining (e.g., keeping, preserving) metadata in the log deletion table that is associated with the database logs that were not deleted in response to the first command, or a combination thereof. Based on the updating, the entity may read the log deletion table to determine which database logs were not deleted in response to the first command and may reissue commands to delete the undeleted database logs. For example, the entity may transmit a second command to the second storage entity to delete the database logs that were not deleted in response to the first command. In some examples, the entity may query the second storage entity to determine whether the undeleted database logs were deleted in response to the second command and update the log deletion table accordingly. In some examples, the entity may continue to reissue deletion commands until the database logs are successfully deleted from the second storage entity or until expiration of a threshold period of time at which point the entity may indicate for a user of the second storage entity to manually delete any remaining database logs that are still stored at the second storage entity.

By supporting the reissuance of deletion commands to delete database logs which failed to be deleted, redundant and unnecessary storage of database logs may be reduced (e.g., eliminated), storage efficiency may be improved, available storage space may be increased, and a frequency at which a user manually deletes a database log from a storage entity may be reduced, among other benefits.

Aspects of the disclosure are initially described in the context of an environment supporting on-demand data backup and retrieval services. Aspects of the disclosure are additionally described in the context of a computing environment, a metadata diagram, and a process flow. Aspects of the disclosure are further illustrated by and described with reference to apparatus diagrams, system diagrams, and flowcharts that relate to techniques for archived log deletion.

FIG. 1 illustrates an example of a computing environment 100 for cloud computing that supports techniques for archived log deletion in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more central processing units (CPUs) and/or one or more graphics processing units (GPUs). Memory 150 may comprise one or more types of (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks (e.g., networks 120). Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, the data center 105 may support the backing up of information stored on a storage appliance 110 or a computing device 115 to one or more components of the data center 105 (e.g., to a server 125, a storage device 130, a storage appliance 135). For example, the data center 105 may support backing up data, virtual machines (point-in-time versions of virtual machines), databases, and database logs, among other information that may be backed up by the data center 105. In some examples, the backing up of database logs may enable and facilitate the restoration (e.g., recovery) of corresponding information (e.g., databases, virtual machines) to the storage appliance 110 or the computing device 115. Based on being backed up to the data center 105, database logs stored at the storage appliance 110 or the computing device 115 may be deleted, for example, to free storage space for other uses. In some cases, however, deletion of one or more database logs may fail and the one or more database logs may remain stored at the storage appliance 110 or the computing device 115 (e.g., unnecessarily, redundantly).

In accordance with examples described herein, the data center 105 (e.g., one or more of the components of the data center 105) may support the deletion of database logs that failed to be deleted from a storage entity (e.g., a storage appliance 110, a computing device 115). For example, the data center 105 may store metadata associated with a set of database logs generated and stored at the storage entity in a log deletion table (e.g., stored, maintained, and updated at a server 125, a storage appliance 135, or a storage device 130) that tracks which database logs are yet to be deleted from the storage entity. The data center 105 may query the storage entity to determine which database logs have been successfully deleted from the storage entity and which database logs remain stored at the storage entity in response to deletion commands transmitted (e.g., issued) by the data center 105 (e.g., by the server 125, by the storage appliance 135). Based on the query, the data center 105 may update the log deletion table, for example, to remove metadata from the log deletion table associated with databases that were successfully deleted from the storage entity. Therefore, the data center 105 may use (e.g., reference, read) the updated log deletion table to determine if there are any database logs that remain stored at the storage entity and may transmit (e.g., reissue, retransmit) deletion commands to the storage entity to delete the remaining database logs.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
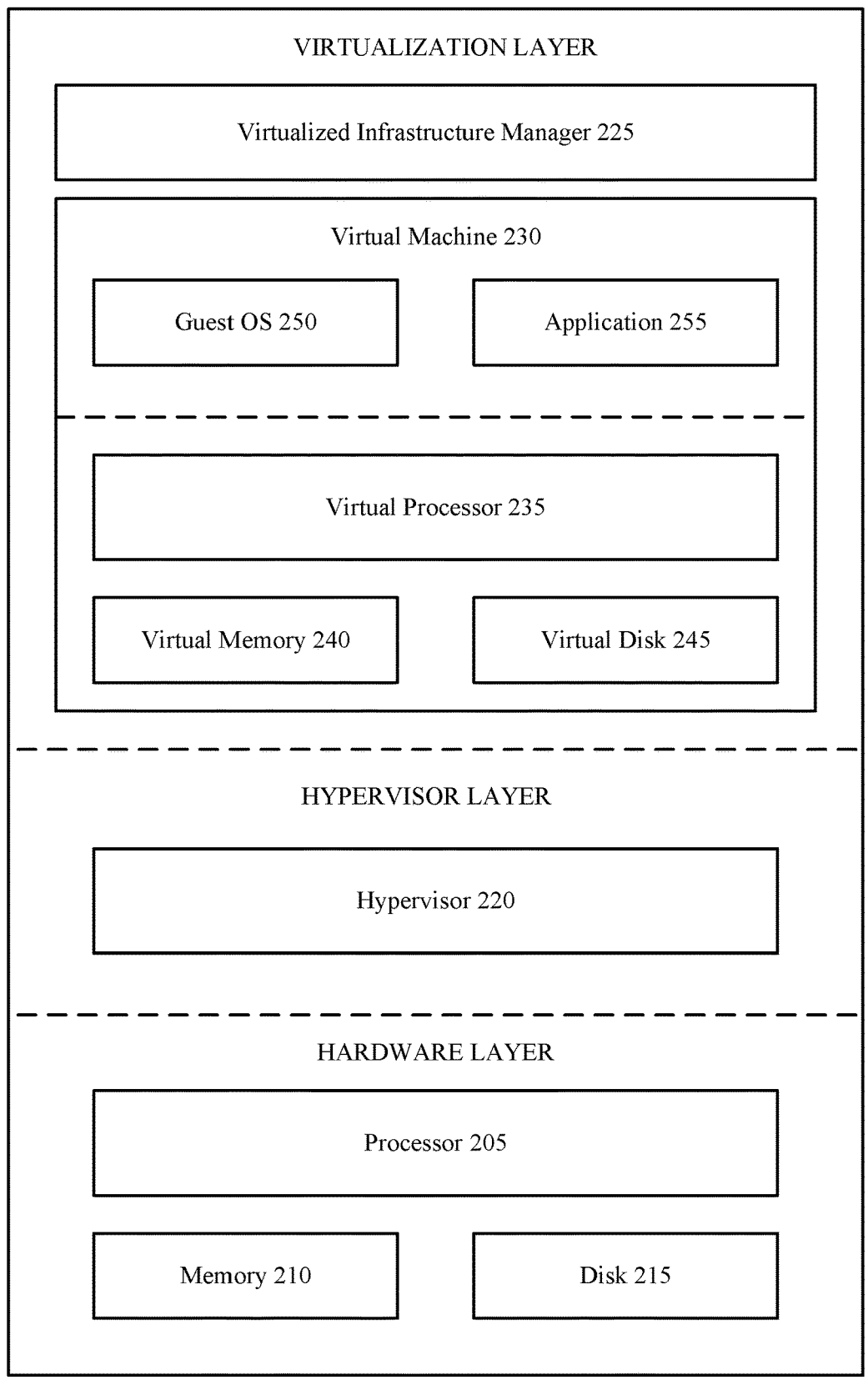
FIG. 2 illustrates an example of a server that supports techniques for archived log deletion in accordance with aspects of the present disclosure.

FIG. 2 illustrates an example of a server 200 that supports techniques for archived log deletion in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk 245 of the plurality of virtual disks 245 associated with a different file stored on the one or more disks 245. Virtual machine 230 may include a guest operating system (OS) 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

In accordance with examples described herein, the server 200 and/or a storage appliance (e.g., a storage appliance 135) may support the deletion of database logs that failed to be deleted from a storage entity (e.g., a storage appliance 110, a computing device 115). The server 200 may store (e.g., or otherwise access or update) metadata associated with a set of database logs generated and stored at the storage entity in a log deletion table (e.g., stored, at the server 200, a storage appliance 135, or a storage device 130) that tracks which database logs are yet to be deleted from the storage entity. The server 200 may query the storage entity (e.g., or receive information related to a query of the storage entity transmitted by a storage appliance 135) to determine which database logs have been successfully deleted from the storage entity and which database logs remain stored at the storage entity in response to deletion commands transmitted by the server 200 (e.g., or by a storage appliance 135). Based on the query, the server 200 may update the log deletion table, for example, to remove metadata from the log deletion table associated with databases that were successfully deleted from the storage entity. The server 200 may use the updated log deletion table to determine if there are any database logs that remain stored at the storage entity and may transmit (e.g., or cause a storage appliance 135 to transmit) deletion commands to the storage entity to delete the remaining database logs.

Figure 3:
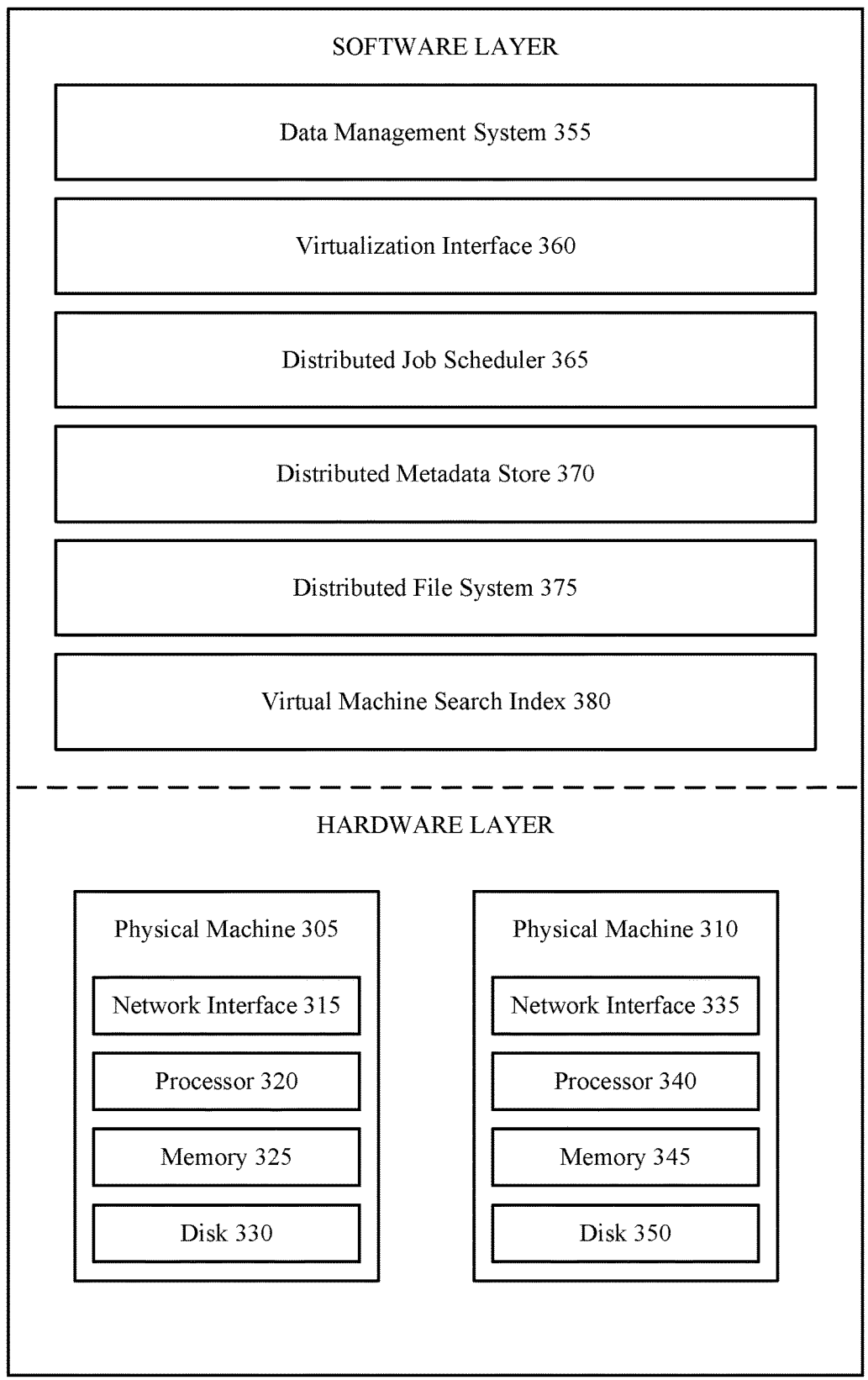
FIG. 3 illustrates an example of a storage appliance that supports techniques for archived log deletion in accordance with aspects of the present disclosure.

FIG. 3 illustrates an example of a storage appliance 300 that supports techniques for archived log deletion in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 terabyte (TB) HDDs), and a network interface controller.

In some examples, the plurality of physical machines may be used to implement a cluster-based network fileserver. The cluster-based network file server may neither require nor use a front-end load balancer. One issue with using a front-end load balancer to host the internet protocol (IP) address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G−i modulo N. In another example, given a number (N) of nodes in a cluster from node(0) to node(N−1), for a floating IP address (i), the VRRP priority of node G may be (i−j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.c-hunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

In accordance with examples described herein, the storage appliance 300 and/or a server 200 may support the deletion of database logs that failed to be deleted from a storage entity (e.g., a storage appliance 110, a computing device 115). The storage appliance 300 may store (e.g., or otherwise access or update) metadata associated with a set of database logs generated and stored at the storage entity in a log deletion table (e.g., stored at the storage appliance 300, such as in the distributed metadata store 370, or stored at the server 200 or a storage device 130) that tracks which database logs are yet to be deleted from the storage entity. The storage appliance 300 may query the storage entity (e.g., or receive information related to a query of the storage entity transmitted by a server 200) to determine which database logs have been successfully deleted from the storage entity and which database logs remain stored at the storage entity in response to deletion commands transmitted by the storage appliance 300 (e.g., or by a server 200). Based on the query, the storage appliance 300 may update the log deletion table, for example, to remove metadata from the log deletion table associated with databases that were successfully deleted from the storage entity. The storage appliance 300 may use the updated log deletion table to determine if there are any database logs that remain stored at the storage entity and may transmit (e.g., or cause a server 200 to transmit) deletion commands to the storage entity to delete the remaining database logs.

Figure 4:
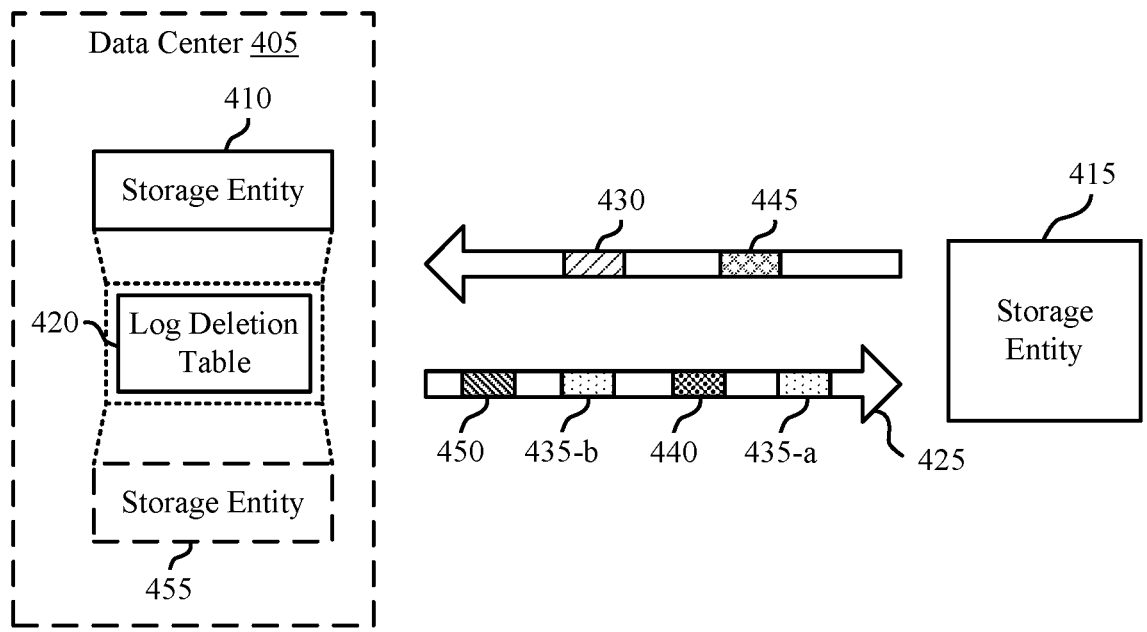
FIG. 4 illustrates an example of a computing environment that supports techniques for archived log deletion in accordance with aspects of the present disclosure.
Figure 4:
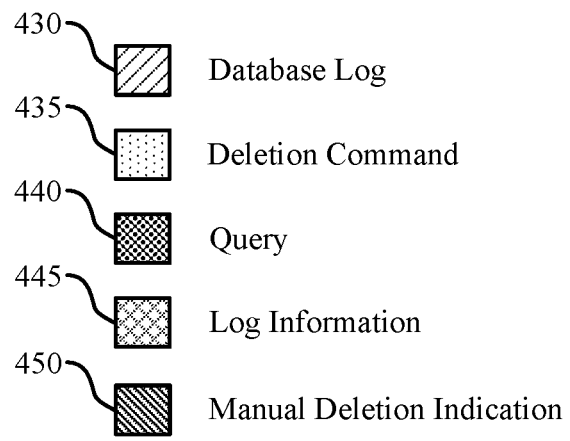

FIG. 4 illustrates an example of a computing environment 400 that supports techniques for archived log deletion in accordance with aspects of the present disclosure. The computing environment 400 may implement or be implemented by aspects of the computing environment 100 described with reference to FIGS. 1 through 3. For example, the computing environment 400 may include a data center 405, which may be an example of a data center 105 described with reference to FIG. 1. Additionally, the computing environment 400 may include a storage entity 415, which may be an example of a storage appliance 110 or a computing device 115 described with reference to FIG. 1. The computing environment 400 may support the deletion of database logs from the storage entity 415 that failed to be deleted from the storage entity 415, which may support reduced storage of redundant information, improved storage efficiency, increased storage availability, and reduced manual deletion of database logs by a user of the storage entity 415, among other benefits.

The computing environment 400 may support communications between the storage entity 415 and the data center 405 (e.g., components of the data center 405 such as a storage entity 410, a storage entity 455, or both). For example, the storage entity 415 and the data center 405 may communicate over respective communication links 425, which may represent communications over a network 120 described with reference to FIG. 1.

The data center 405 may include a storage entity 410, which may be an example of the servers (e.g., server 125 and server 200), the storage appliances (e.g., storage appliance 135 and storage appliance 300), or the storage devices (e.g., storage device 130) as described with respect to FIGS. 1 through 3. The storage entity 410 may be configured (e.g., operable) to backup information stored at the storage entity 415 such that the information may be restored to the storage entity 415 (e.g., in response to a request from the storage entity 415). For example, the storage entity 410 may be configured to store databases (e.g., snapshots of databases) or virtual machines (e.g., snapshots of virtual machines) generated and stored at the storage entity 415 so that the databases or virtual machines may be deleted (e.g., at least in part) from the storage entity 415, for example, to free storage space of the storage entity 415 occupied by the databases of virtual machines.

Additionally or alternatively, the storage entity 410 may be configured to store database logs 430 generated and stored at the storage entity 415 that facilitate (e.g., enable, support) the restoration of the databases (e.g., or virtual machines) to the storage entity 415. For example, a database log 430 may correspond to a database (e.g., a snapshot of the database) and track updates made to the database. For instance, as the storage entity 415 updates the database, the storage entity 415 may update the corresponding database log 430 to track (e.g., record) the updates made to the database (e.g., since a last snapshot of the database) such that the database may be properly recovered.

Database logs 430 may be backed up to the storage entity 410 so that the database logs 430 may be deleted from the storage entity 415, for example, to free storage space of the storage entity 415 occupied by the database logs 430. For instance, the storage entity 415 may transmit a set of database logs 430 to the data center 405 (e.g., to the storage entity 410) for storage at the storage entity 410 as part of a backup procedure for backing up the set of database logs 430 from the storage entity 415 to the storage entity 410. In some examples, the backup procedure may also include or be associated with a backup of one or more databases (e.g., database snapshots) corresponding to the set of database logs 430 from the storage entity 415 to the storage entity 410 (e.g., or another storage entity included in the data center 405).

In accordance with (e.g., as part of) the backup procedure, the data center 405 (e.g., the storage entity 410, another storage entity included in the data center 405 such as the storage entity 455) may transmit (e.g., issue) a deletion command 435-a to the storage entity 415 that indicates for the storage entity 415 to delete one or more of the set of database logs 430 from the storage entity 415 (e.g., and a standby server to which the one or more database logs 430 have been replicated). In some examples, the data center 405 may transmit the deletion command 435-a in accordance with a user configuration of the storage entity 415. For example, the user configuration may indicate whether database logs 430 are to be deleted from the storage entity 415 and may indicate a time at which the database logs 430 are to be deleted from the storage entity 415 (e.g., if the database logs 430 are to be deleted). For instance, the user configuration may indicate that the deletion of the database logs 430 from the storage entity 415 is to be skipped. Here, the data center 405 may refrain from issuing a deletion command 435 to the storage entity 415, for example, until the user configuration is changed to indicate that the database logs 430 are to be deleted from the storage entity 415. Alternatively, the user configuration may indicate that the database logs 430 are to be deleted from the storage entity 415 and may indicate a retention time period for the database logs 430 to remain stored at the storage entity 415 after the backup of the database logs 430 to the storage entity 410. Here, the data center 405 may transmit the deletion command 435-a after an expiration of the retention time period. For example, if the user configuration indicates a retention time period of 4 hours, the data center 405 may wait until at least 4 hours after the one or more database logs 430 were backed up to the storage entity 410 to issue the deletion command 435-a.

In some cases, deletion of one or more of the database logs 430 indicated for deletion by the deletion command 435-a may fail. For example, the network connection between the data center 405 and the storage entity 415 may fail such that the deletion command 435-a is not received or decoded properly by the storage entity 415. Additionally or alternatively, execution of a log deletion script at the data center 405 that is associated with generating and transmitting the deletion command 435-a may fail. Additionally or alternatively, the storage entity 415 may be configured to replicate database logs 430 to a standby server (e.g., in accordance with a golden gate or data guard configuration), but the deletion command 435-a may be issued before the one or more database logs 430 are replicated. Here, the storage entity 415 may refrain from deleting the one or more database logs 430 based on the one or more database logs 430 not yet being replicated to the standby server prior to receiving the deletion command 435-a. Failing to delete database logs 430 from the storage entity 415 may result in the unnecessary and undesired storage of the database logs 430 at the storage entity 415, thereby reducing storage space of the storage entity 415 available for other information (e.g., other database logs 430, other databases).

To enable the deletion of database logs 430 that failed to be deleted from the storage entity 415, the data center 405 (e.g., one or more components of the data center 405) may implement a log deletion table 420. In some examples, the log deletion table 420 may be stored at the storage entity 410. In some examples, the log deletion table 420 may be stored at another storage entity of the data center 405, such as the storage entity 455.

The log deletion table 420 may store metadata associated with database logs 430 that have been backed up by the storage entity 410 and are yet to be deleted from the storage entity 415. For example, as part of the backup procedure for backing up the set of database logs 430, the data center 405 may store metadata associated with the set of database logs 430 in the log deletion table 420 (e.g., as described with reference to FIG. 5 below). After (e.g., or in conjunction with) transmitting the deletion command 435-a, the data center 405 may transmit a query 440 to the storage entity 415 that inquires (e.g., requests for the storage entity 415 to indicate) whether the one or more database logs 430 indicated for deletion by the deletion command 435-a were deleted from the storage entity 415 in response to deletion command 435-a. In response to the query 440, the storage entity 415 may transmit log information 445 to the data center 405 that indicates which of the database logs 430 were deleted from the storage entity 415 in response to the deletion command 435-a, which of the database logs 430 remain stored at the storage entity 415 in response to the deletion command 435-a, or a combination thereof. The data center 405 may update the log deletion table 420 based on the log information 445 (e.g., as described with reference to FIG. 5 below). For example, the data center 405 may delete (e.g., removed) metadata from the log deletion table 420 that is associated with database logs 430 that were deleted in response to the deletion command 435-a, while metadata associated with database logs 430 that were not deleted in response the deletion command 435-a may remain in the log deletion table 420.

Using the log deletion table 420, the data center 405 may reattempt to delete database logs 430 stored at the storage entity 415. For example, the data center 405 may query the log deletion table 420 after updating the log deletion table 420 to determine the database logs 430 that were not deleted from the storage entity 415 in response to the deletion command 435-a. Based on the determination, the data center 405 may transmit an additional deletion command 435 (e.g., a deletion command 435-b) to the storage entity 415 to delete the database logs 430 that were not deleted from the storage entity 415 in response to the deletion command 435-a. If the deletion of the database logs 430 is successful in response to the deletion command 435-b, the data center 405 may delete the metadata associated with the database logs 430 from the log deletion table 420. If one or more of the database logs 430 fail to be deleted in response to the deletion command 435-b (e.g., determined based on an additional query 440 of the storage entity 415), the data center 405 may continue to transmit additional deletion commands 435 to delete the undeleted database logs 430.

In some examples, the data center 405 may continue to transmit additional deletion commands 435 until each of the one or more database logs 430 indicated by the deletion command 435-a are successfully deleted from the storage entity 415. In some other examples, the data center 405 may continue to transmit additional deletion commands 435 for a threshold period of time. For example, the data center 405 may be configured with a threshold period of time (e.g., a log deletion retry time, a metadata retention time period) that corresponds to a period of time within which the data center 405 may retry database log deletion (e.g., transmit additional deletion commands 435). In some examples, the threshold period of time may begin after transmission of the deletion command 435-a (e.g., after expiration of the retention time period). After expiration of the threshold period of time, the data center 405 may delete (e.g., remove), from the log deletion table 420, metadata associated with still undeleted database logs 430 of the one or more database logs 430 indicated by the deletion command 435-a. Based on deleting the metadata from log deletion table 420, deletion attempts for the still undeleted database logs 430 may no longer be attempted by the data center after the expiration of the threshold period of time.

In some examples, the data center 405 may issue an indication for a user of the storage entity 415 to manually delete database logs 430 whose associated metadata has been stored in the log deletion table 420 for the threshold period of time. For example, the data center 405 may transmit a manual deletion indication 450 to the storage entity 415 that indicates for the user of the storage entity 415 to manually delete the still undeleted database logs 430 (e.g., due to the continued unsuccessful deletion of the database logs 430 within the threshold period of time). In some examples, the data center 405 may transmit the manual deletion indication 450 based on or in response to deleting the metadata associated with the still undeleted database logs 430 from the log deletion table 420.

In some examples, the user configuration of the retention time period for storing the database logs 430 at the storage entity 415 after backing up the database logs 430 to the storage entity 410 may change, which may affect for which database logs 430 the data center 405 attempts deletion retry. For example, if retention time period is configured to be 60 days and the log deletion retry time (e.g., the threshold period of time) is configured to be 5 days, the log deletion table 420 may store metadata associated with up to 65 days of database logs 430 backed up to the storage entity 410 (e.g., retention time period+log deletion retry time=65 days). If the retention time period is changed to 2 days, the data center 405 may attempt to delete each of the database logs 430 from the storage entity 415 that have been backed up for at least 2 days and may retry deletion of database logs 430 from the storage entity 415 that have been backed up for at least 2 days and less than or equal to 7 (e.g., retention time period+log deletion retry time=7 days). That is, the data center 405 may use the current values of the retention time period and the log deletion retry time in determining which metadata to store in the log deletion table 420 and thus which database logs 430 for which to retry deletion from the storage entity 415.

In some examples, the data center 405 may retry database log deletion (e.g., transmit additional deletion commands 435) in accordance with a log backup frequency. For example, a log backup frequency may correspond to a frequency at which database logs 430 are backed up from the storage entity 415 to the storage entity 410. The data center 405 may retry database log deletion as part of subsequent backup procedures for database logs 430 that are performed in accordance with the log backup frequency. For example, the data center 405 may store metadata associated with a second set of database logs 430 in the log deletion table 420 as part of a second backup procedure for backing up the second set of database logs 430 from the storage entity 415 to the storage entity 410. The data center 405 may be configured to retry log deletion as part of the second backup procedure. That is, the data center 405 may transmit the deletion command 435-b as part of (e.g., during) the second backup procedure.

In some examples, the data center 405 may be toggled to store metadata associated with database logs 430 in the log deletion table 420 and to reattempt deletion of database logs 430 using the log deletion table 420. For example, the data center 405 may be configured with a flag that indicates whether the data center is to store the metadata in the log deletion table 420 and reattempt database log deletion. In some examples, if the flag is set to 'false', the data center 405 may refrain from storing the metadata in the log deletion table 420 and reattempting database log deletion, whereas if the flag is set to 'true', the data center 405 may store the metadata in the log deletion table 420 and reattempt database log deletion (e.g., or vice versa).

FIG. 5 illustrates an example of a metadata diagram 500 that supports techniques for archived log deletion in accordance with aspects of the present disclosure. The metadata diagram 500 may implement or be implemented by aspects of the computing environment 100 and 400 described with reference to FIGS. 1 through 4. For example, the metadata diagram 500 may be implemented by a data center or a storage entity (e.g., a server 125, 200, a storage appliance 135, 300) described with reference to FIGS. 1 through 4. The metadata diagram 500 may be implemented to support the deletion of database logs that failed to be deleted from a storage entity (e.g., as part of a backup procedure of the database logs).

For example, the metadata diagram 500 illustrates a log deletion table 505 that may be implemented (e.g., stored, generated, maintained, updated) by one or more components of a data center, such as a storage entity, a server, or a storage appliance described with reference to FIGS. 1 through 4. It is noted that, for clarity, some operations described in the example of FIG. 5 are described as being performed by a data center, however, the techniques described herein may be adapted and applied such that a single storage entity or a combination of storage entities may perform the operations performed by the data center.

The log deletion table 505 may be organized into rows R and columns such that storage and access of information (e.g., metadata) in the log deletion table 505 is possible. For example, each row R of the log deletion table 505 may include a database identifier (ID) 510, a row ID 515, a state ID 520, a time period 525, and metadata 530, or a combination thereof. A database ID 510 may indicate a database with which the metadata 530 stored in the row R is associated. A row ID 515 may indicate a given row R of the log deletion table 505 and may be used in accessing the log deletion table 505 to store and make updates to the metadata 530 in the given row R. In some examples, a data center may use a composite of a database ID 510 and row ID 515 to query the log deletion table 505 and retrieve information stored in a corresponding row R. A state ID 520 may be used to support atomic persistence of the information in the row when updating the information in the row R.

A time period 525 may indicate a time period within which metadata 530 may be stored in the log deletion table 505 as part of respective backup procedures. For example, the time period 525 may indicate a "first log snapshot date" and a "last log snapshot date," and metadata 530 that is generated as part of a backup procedure that occurs between the first log snapshot date and the last log snapshot date and corresponds to the database indicated by the database ID 510 may be stored in the row R. For instance, if the database ID 510 is D1, the row ID 515 is R1, the first log snapshot date is: 2021-01-19 08:00:00+00:00, and the last log snapshot date is: 2021-01-19 11:00:00+00:00, then the data center may store metadata 530 in the row R1 that is generated as part of a backup procedure for database logs corresponding to the database D1 and that occurs between 08:00:00+00:00 and 11:00:00+00:00 on 2021-01-19. Metadata 530 associated with a backup procedure that occurs outside of the time period 525 or is associated with a different database may be stored in a different row R of the log deletion table 505.

Metadata 530 may include information that supports database log deletion retry in accordance with examples described herein. For example, metadata 530 may include a set of identifiers associated with a set of database logs backed up to the data center as part of a backup procedure. The set of identifiers may include a first identifier associated with the backup procedure, a second identifier associated with a storage entity from which the database logs are backed up, a third identifier associated with a beginning database log of the set of database logs, a fourth identifier associated with a last database log of the set of database logs, a fifth identifier associated with a reset instance of the storage entity from which the database logs are backed up, or a combination thereof.

The first identifier may be a "log snapshot ID" that indicates the backup procedure (e.g., an ID of a particular snapshot with which the set of database logs are associated).

The second identifier may be a "thread number" that indicates the particular storage entity from which the set of database logs are backed up. For example, a given database D may be shared by (e.g., be commonly accessed by) multiple storage entities. Each storage entity that accesses the database may generate respective database logs that may be backed up to the data center. Accordingly, the second identifier may indicate which storage entity of the multiple storage entities associated with the database D from which the set of database logs are received. The fifth identifier may be a "resetlog ID" that indicates a particular reset instance (e.g., incarnation) of the storage entity from the database logs are backed up. For example, errors may occur at the storage entity that cause the storage entity to perform a reset from a current state back to an earlier state, which may cause some data stored in the storage entity to be lost or changed. After the reset, the storage entity may continue to operate as normal and the operations performed after the reset up until a next reset may be associated with a particular reset instance or incarnation of the storage entity. Accordingly, the fifth identifier may indicate the reset instance of the storage entity when the backup procedure for the set of database logs stored at the storage entity was performed.

The metadata 530 may also include a time at which the backup procedure is performed, a data at which the backup procedure is performed, an indication of a user configuration of the storage entity from which the database logs are backed up, or a combination thereof. An example of a first entry included in metadata M1 of row R1 is included below:

M1: {"log_snapshot_id": log_uuid1; "log_snapshot_date": 2021-01-19 08:00:00+00:00; "host_log_retention_hours": 32; "archivelog_details": {"3/12345": ["1/233/236"]}}

In this example, the first entry indicates a backup procedure having an ID of log_uuid1 and performed on 2021-01-19 at 08:00:00+00:00. The first entry further indicates that the user configuration indicates a retention time period (e.g., a "host_log_retention_hours") of 32 hours. The first entry also includes "archivelog_details" that indicate a reset instance of "3/12345" and indicate that a sequence of database logs from database log 233 to database log 236 were backed up from a storage entity having an ID of 1 as part of the backup procedure.

In some examples, a single backup procedure may include the backup of database logs from multiple storage entities. For example, the "archivelog_details" of the first entry of M1 may be: {"3/12345": ["1/233/236", "2/254/256"]}. Here, the "archivelog_details" indicate that a sequence of database logs from database log 254 to database log 256 were backed up from a second storage entity having an ID of 2 as part of the backup procedure.

Based on each row R being associated with a time period 525, the metadata 530 stored in a given row R may include metadata 530 corresponding to multiple backup procedures. For example, the metadata M1 may include multiple entries corresponding to backup procedures for database logs associated with the database D1 and that occur within the time period T1, such as an additional entry:

M1: {"log_snapshot_id": log_uuid9; "log_snapshot_date": 2021-01-19 11:00:00+00:00; "host_log_retention_hours": 32; "archivelog_details": {"3/12345": ["1/265/265", "2/277/278"]}}

That is, the metadata M1 may include respective entries for each backup procedure associated with database D1 and performed within the time period T1.

The log deletion table 505 may include any quantity of rows R that each include respective information. For example, the log deletion table 505 may include a row R1, a row R2, a row R3, and so on up through a row Rn. The row R1 may be associated with a database D1, a state S1, a time period T1, and metadata M1; the row R2 may be associated with the database D1, a state S2, a time period T2, and metadata M2; the row R3 may be associated with a database D2, a state S3, a time period T3, and metadata M3; and so on up through the row Rn being associated with a database Dn, a state Sn, a time period Tn, and metadata Mn. In some examples, respective time periods T that are associated with a same database D may be non-overlapping. For example, the time period T1 and the time period T2 may be non-overlapping time periods based on each being associated with the database D1. In some examples, respective time periods that are associated with different databases D may be overlapping or non-overlapping. For example, the time period T1 and the time period T3 may be overlapping or non-overlapping based on each being associated with a different database D.

The data center may use the metadata stored in each entry of metadata 530 to issue deletion commands to respective storage entities. For example, the data center may query the log deletion table 505 and read the first entry of the metadata M1. If the retention time period of 32 hours has expired since the backup procedure having the ID of log_uuid1 was performed (e.g., at least 32 hours has passed since 2021-01-19 08:00:00+00:00), the data center may transmit a deletion command to the storage entity 1 to delete the sequence of database logs from database log 233 to database log 236 from the storage entity 1. The data center may also transmit a deletion command to the storage entity 2 to delete the sequence of database logs from database log 254 to database log 256.

The data center may query the respective storage entities to determine whether the database logs were deleted from the respective storage entities and update the log deletion table 505 (e.g., the first entry of the metadata M1) accordingly. In some examples, the data center may delete (e.g., remove) the first entry from the metadata M1 if the query indicates that all of the database logs were deleted from the respective storage entities. In some examples, the data center may update the first entry to indicate which database logs were deleted from the respective storage entities. For example, if the sequence of database logs were deleted from the storage entity 2, the data center may update the first entry to delete "2/254/256" from the "archivelog_details." In some examples, if one or more database logs of a sequence were not deleted, the data center may maintain the related information in the "archivelog_details," for example, to reduce updates made to the log deletion table 505. For example, if the database logs 234 and 236 were deleted from the storage entity 1 but the database logs 233 and 235 were not deleted from the storage entity, the data center may maintain the "archivelog_details" of the first entry to include "1/233/236." In some examples, the data center may update the "archivelog_details" to indicate which database logs of a sequence were deleted. For example, if the database logs 234 and 236 were deleted from the storage entity 1, the data center may update the "archivelog_details" of the first entry to include "1/233/233" and "1/235/235."

The data center may use the updated log deletion table 505 (e.g., the updated first entry of the metadata M1) to reattempt to delete the database logs that were not deleted from the respective storage entities. For example, the data center may transmit an additional deletion command to delete the database logs from the storage entity 1 that were not successfully deleted. The data center may not transmit an additional command to delete the database logs from the storage entity 2 based on the updated first entry indicating that the sequence of database logs were deleted from the storage entity 2. In some examples, the additional command may include identifiers of database logs that were deleted from the storage entity 1 and identifiers of database logs that were not deleted from the storage entity 1. For example, if the data center updates the first entry such that the "1/233/ 236" of the "archivelog_details" of the first entry is maintained, the data center may indicate in the additional deletion command for the storage entity 1 to delete the sequence of database logs from database log 233 to 236. While the database logs 234 and 236 are already deleted from the storage entity 1, such an indication in the additional deletion command may not cause any errors at the storage entity 1 (e.g., attempting to delete an already deleted database log may not cause errors) while reducing updates to the log deletion table 505, reducing a quantity of deletion commands transmitted to the storage entity 1, simplifying an update procedure of the log deletion table 505 (e.g., remove the information when the entire sequence is successfully deleted from the storage entity), or a combination thereof, among other benefits.

In some examples, the data center may remove entries of metadata M that have been stored in the log deletion table 505 for a threshold period of time (e.g., a log deletion retry time). For example, if the log deletion retry time is configured to be 5 days, then the data center may delete the first entry from metadata M1 5 days and 32 hours (e.g., log deletion retry time+retention time period) after being stored in the log deletion table 505 (e.g., 5 days and 32 hours after 2021-01-19 08:00:00+00:00) if the first entry has not yet been deleted from the metadata M1 (e.g., based on the associated database logs being successfully deleted from the respective storage entities). In some examples, based on deleting the first entry from the metadata M1 after the log deletion retry time expires, the data center may determine the database logs indicated by the first entry (e.g., still included in the first entry) and transmit a manual deletion indication to the respective storage entities to manually delete the database logs that remain stored at the respective storage entities.

In some examples, the data center may delete (e.g., remove) a row R from the log deletion table 505 if each of the entries included in metadata M of the row R are deleted. For example, if each of the entries of M1 are deleted (e.g., based on the corresponding database logs being deleted from the respective storage entities, based on the entries being stored for the threshold period of time), the data center may trim the log deletion table 505 by deleting the row R1 from the log deletion table 505. Such trimming may reduce a size of the log deletion table 505 and prevent the log deletion table 505 from growing indefinitely with time.

Figure 6:
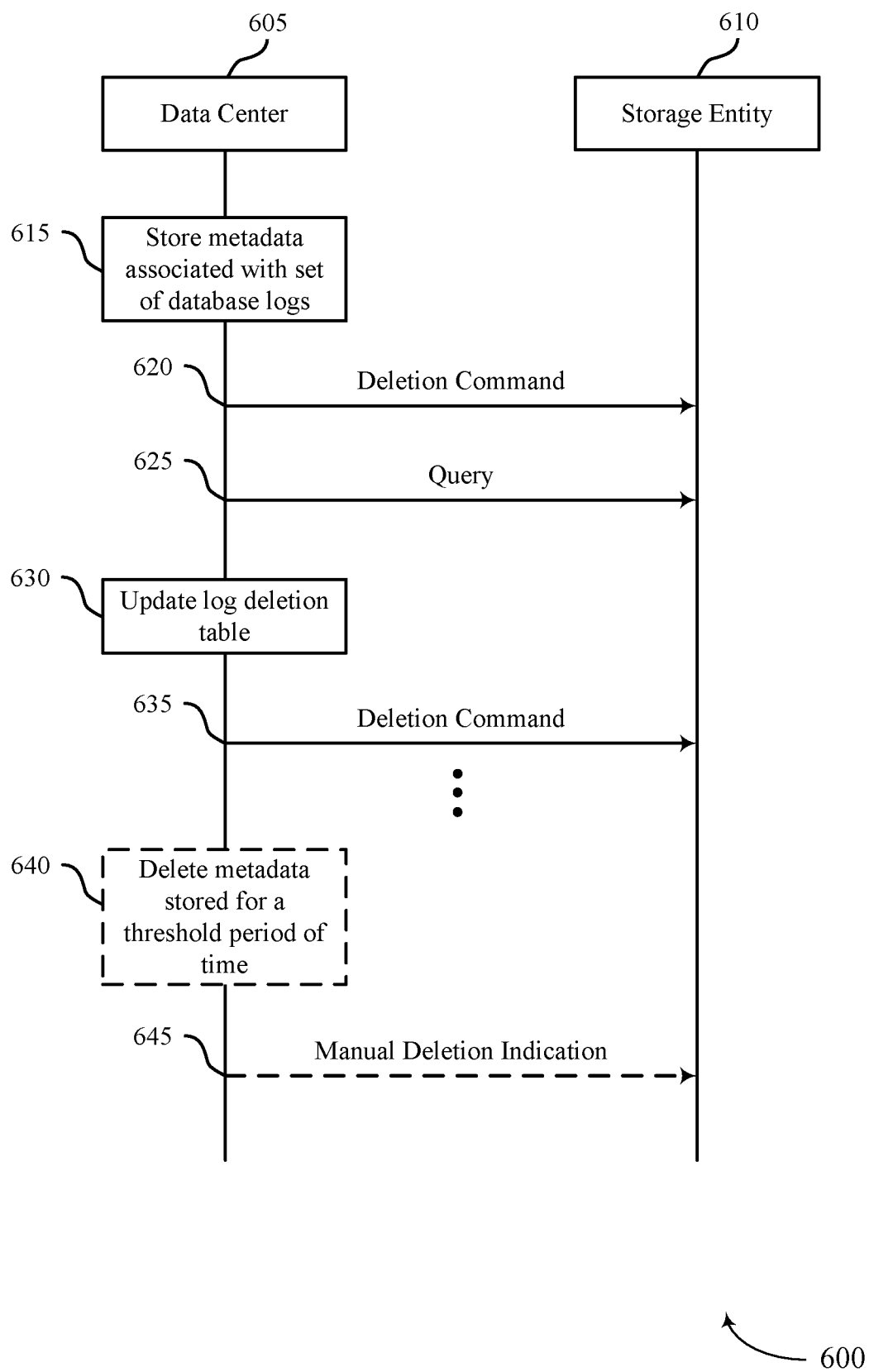
FIG. 6 illustrates an example of a process flow that supports techniques for archived log deletion in accordance with aspects of the present disclosure.

FIG. 6 illustrates an example of a process flow 600 that supports techniques for archived log deletion in accordance with aspects of the present disclosure. The process flow 600 may implement or be implemented by aspects of the computing environments (e.g., computing environments 100 and 400) as described with reference to FIGS. 1 through 5. For example, the process flow 600 may be implemented by a data center 605 and a storage entity 610 to support the deletion of database logs that failed to be deleted from the storage entity 610.

The data center 605 may be an example of a data center as described with reference to FIGS. 1 through 5. The storage entity 610 may be an example of a storage appliance 110, a computing device 115, or a storage entity 415 as described with reference to FIGS. 1 through 5. In the following description of the process flow 600, the operations between the data center 605 and the storage entity 610 may be communicated in a different order than the example order shown, or the operations performed by the data center 605 and the storage entity 610 may be performed in different orders or at different times. Some operations may also be omitted from the process flow 600, and other operations may be added to the process flow 600. Further, although some operations or signaling may be shown to occur at different times for discussion purposes, these operations may actually occur at the same time.

At 615, the data center 605 may store metadata associated with a set of database logs in a log deletion table. For example, the data center 605 may perform a backup procedure with the storage entity 610 in which the set of database logs are backed up from the storage entity 610 to the data center 605 (e.g., a storage entity included in the data center 605). As part of the backup procedure, the data center 605 may store the metadata associated with the set of database logs in the log deletion table (e.g., which may be stored and updated at the storage entity to which the set of database logs are backed up or at another storage entity included in the data center 605).

At 620, the data center 605 may transmit a deletion command (e.g., a deletion command 435) to the storage entity 610 to delete one or more database logs of the set of database logs from the storage entity. In some examples, the data center 605 may transmit the deletion command as part of the backup procedure. In some examples, the data center 605 may transmit the deletion command in accordance with a user configuration of the storage entity 610. For example, the data center 605 may transmit the deletion command after an expiration of a retention time period that indicates how long the database logs are to be stored at the storage entity 610 after being backed up to data center 605 and before an attempt to delete the database logs from the storage entity 610.

At 625, the data center 605 may query (e.g., transmit a query 440 to) the storage entity 610 about whether the one or more database logs were deleted from the storage entity 610 in response to the deletion command. For example, the data center 605 may request for the storage entity 610 to indicate which database logs of the one or more database logs were successfully deleted from the storage entity 610 in response to the deletion command, which database logs failed to be deleted from the storage entity 610 in response to the deletion command, or a combination thereof.

At 630, the data center 605 may update the log deletion table based on the query. For example, the data center 605 may update the log deletion table to delete metadata from the log deletion table that is associated with database logs that were successfully deleted from the storage entity 610 in response to the deletion command. Metadata associated with database logs that were not deleted in response to the deletion command may remain stored in the log deletion table. In some examples, metadata associated with a database log that was successfully deleted may remain stored in the log deletion table after the updating, for example, if the metadata associated with the database log is associated with a sequence of database logs that includes database log(s) that were not deleted (e.g., as described with reference to FIG. 5).

At 635, the data center 605 may retry to delete the database logs that were not deleted in response to the deletion command. For example, the data center 605 may use the updated log deletion table to determine which database logs were not deleted from the storage entity 610 in response to the deletion command and may transmit an additional deletion command to the storage entity 610 to delete the database logs that were not deleted in response to the deletion command (e.g., database logs of the one or more database logs that remain stored at the storage entity 610 in response to the deletion command).

In some examples, the data center 605 may query the storage entity 610 about whether the database logs were deleted in response to the additional command and update the log deletion table accordingly. In some cases, the data center 605 may continue to transmit deletion commands, query the storage entity 610, and update the log deletion table if database logs of the one or more database logs indicated by the deletion command continue to be stored at the storage entity 610 (e.g., continue to fail to be deleted). In some examples, the data center 605 may continue to retry to delete the database logs until each of the database logs are successfully deleted from the storage entity 610.

In some examples, the data center 605 may continue to retry to delete the database logs for a threshold period of time (e.g., until expiration of a log deletion retry time). For example, at 640, the data center 605 may delete metadata from the log deletion table that has been stored in the log deletion table for the threshold period of time (e.g., starting after transmission of the initial deletion command). For instance, if a database log fails to be deleted from the storage entity 610 in response deletion commands transmitted within the threshold period of time, the metadata associated with the database log may continue to be stored in the log deletion table for the threshold period of time. After (e.g., in response to) expiration of the threshold period of time, the data center 605 may delete the metadata associated with the database log from the log deletion table. As a result, the data center 605 may no longer attempt to the delete the database log from the storage entity 610.

In some examples, the data center 605 may indicate for the database log that failed to be deleted within the threshold period of time to be manually deleted from the storage entity 610 by the user of the storage entity 610. For example, at 645, the data center 605 may transmit a manual deletion indication (e.g., a manual deletion indication 450) to the storage entity 610 based on deleting the metadata associated with the database log from the log deletion table. The manual deletion indication may indicate for the user of the storage entity 610 to manually delete the database log from the log deletion table. In this way, the database log may still be deleted from the storage entity 610 despite failing to be deleted based on the retry attempts by the data center 605, although the deletion retry attempts performed by the data center 605 in accordance with the log deletion table may reduce a frequency at which manual deletion of database logs from the storage entity 610 by the user is indicated (e.g., necessary).

Figure 7:
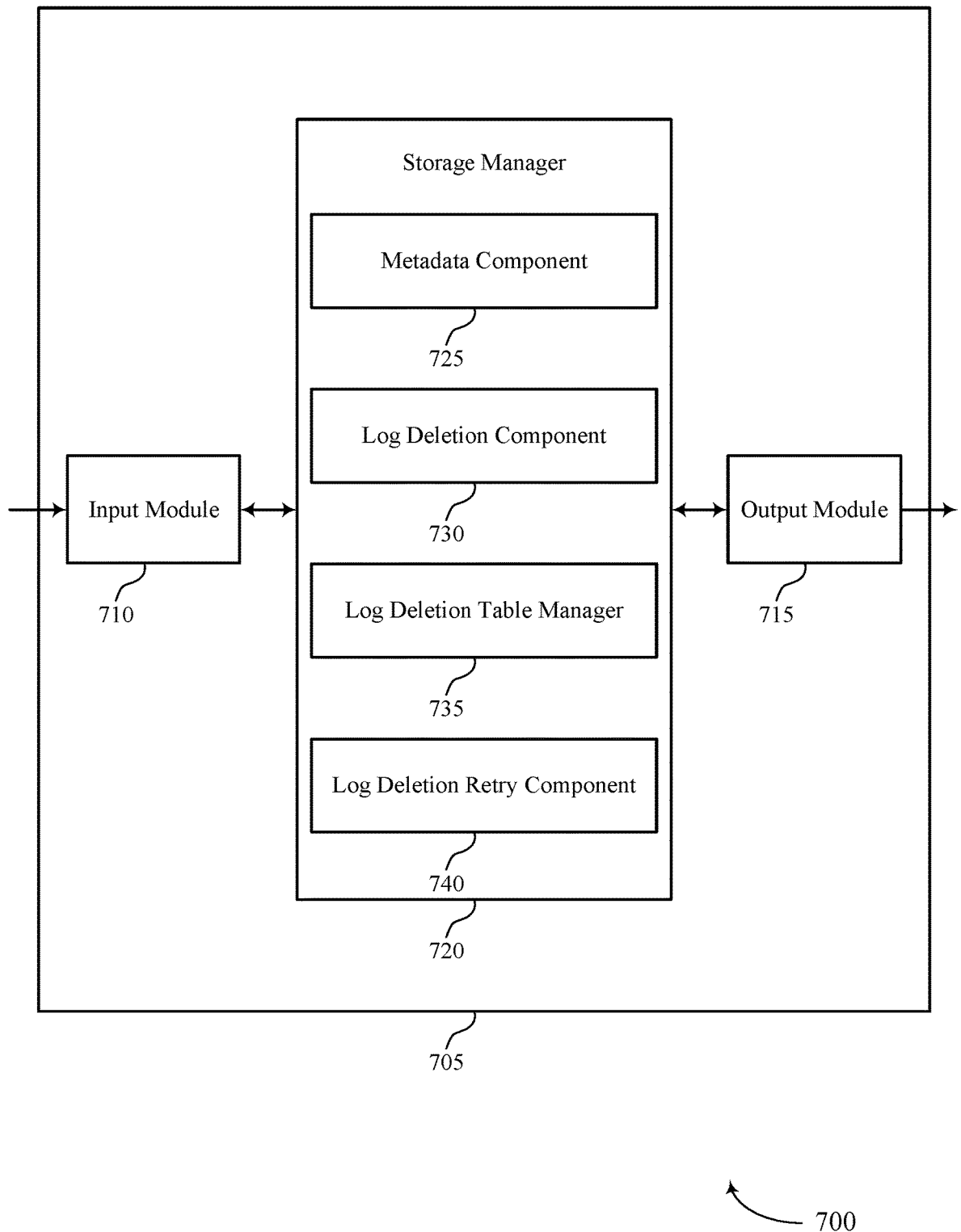
FIG. 7 shows a block diagram of an apparatus that supports techniques for archived log deletion in accordance with aspects of the present disclosure.

FIG. 7 shows a block diagram 700 of a device 705 that supports techniques for archived log deletion in accordance with aspects of the present disclosure. The device 705 may include an input module 710, an output module 715, and a storage manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the storage manager 720 to support techniques for archived log deletion. In some cases, the input module 710 may be a component of a network interface 910 as described with reference to FIG. 9.

The output module 715 may manage output signals for the device 705. For example, the output module 715 may receive signals from other components of the device 705, such as the storage manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of a network interface 910 as described with reference to FIG. 9.

The storage manager 720 may include a metadata component 725, a log deletion component 730, a log deletion table manager 735, a log deletion retry component 740, or any combination thereof. In some examples, the storage manager 720, or various components thereof, may be configured to perform various operations (e.g., receiving, monitoring, transmitting) using or otherwise in cooperation with the input module 710, the output module 715, or both. For example, the storage manager 720 may receive information from the input module 710, send information to the output module 715, or be integrated in combination with the input module 710, the output module 715, or both to receive information, transmit information, or perform various other operations as described herein.

The storage manager 720 may support data management in accordance with examples as disclosed herein. The metadata component 725 may be configured as or otherwise support a means for storing metadata associated with a set of database logs in a log deletion table as part of a backup procedure for backing up the set of database logs from a second storage entity to a first storage entity. The log deletion component 730 may be configured as or otherwise support a means for transmitting, to the second storage entity and in accordance with a user configuration of the second storage entity, a first command to delete one or more database logs of the set of database logs from the second storage entity in accordance with the backup procedure. The log deletion table manager 735 may be configured as or otherwise support a means for updating the log deletion table based on a query of the second storage entity of whether the one or more database logs were deleted from the second storage entity in response to the first command. The log deletion retry component 740 may be configured as or otherwise support a means for transmitting, to the second storage entity and based on the updated log deletion table, a second command to delete one or more of the database logs that were not deleted from the second storage entity in response to the first command.

Figure 8:
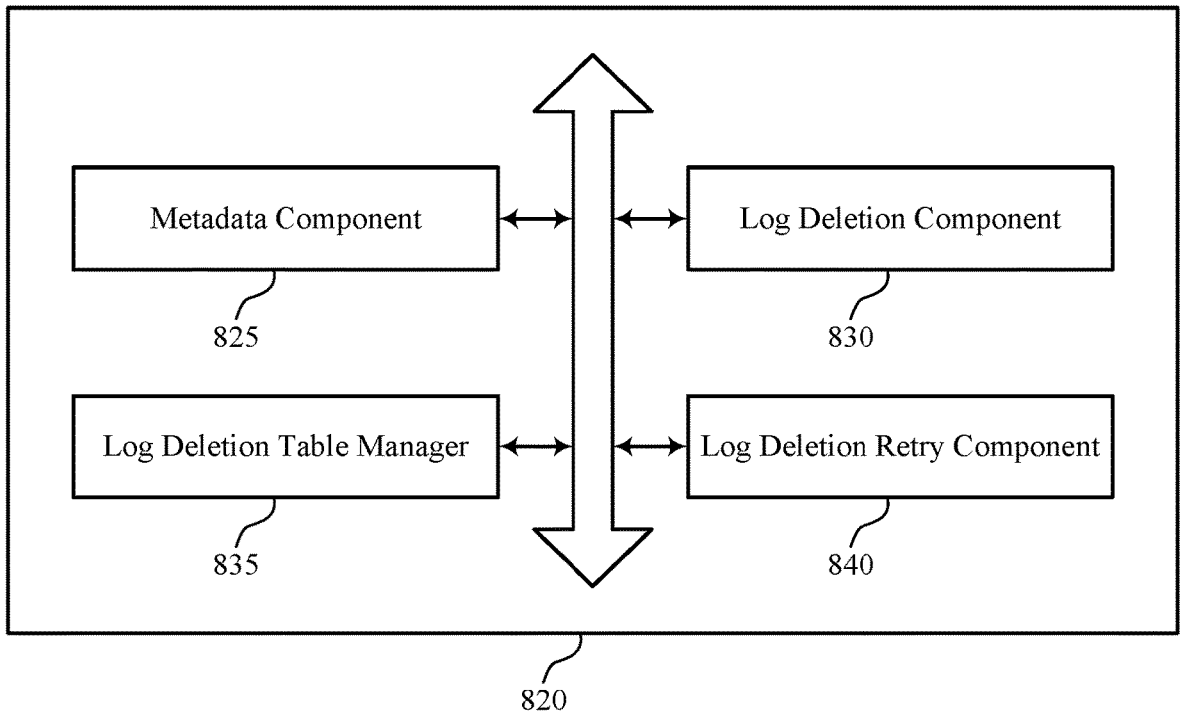
FIG. 8 shows a block diagram of a storage manager that supports techniques for archived log deletion in accordance with aspects of the present disclosure.

FIG. 8 shows a block diagram 800 of a storage manager 820 that supports techniques for archived log deletion in accordance with aspects of the present disclosure. The storage manager 820 may be an example of aspects of a storage manager or a storage manager 720, or both, as described herein. The storage manager 820, or various components thereof, may be an example of means for performing various aspects of techniques for archived log deletion as described herein. For example, the storage manager 820 may include a metadata component 825, a log deletion component 830, a log deletion table manager 835, a log deletion retry component 840, or any combination thereof. Each of these components may communicate, directly or indirectly, with one another (e.g., via one or more buses).

The storage manager 820 may support data management in accordance with examples as disclosed herein. The metadata component 825 may be configured as or otherwise support a means for storing metadata associated with a set of database logs in a log deletion table as part of a backup procedure for backing up the set of database logs from a second storage entity to a first storage entity. The log deletion component 830 may be configured as or otherwise support a means for transmitting, to the second storage entity and in accordance with a user configuration of the second storage entity, a first command to delete one or more database logs of the set of database logs from the second storage entity in accordance with the backup procedure. The log deletion table manager 835 may be configured as or otherwise support a means for updating the log deletion table based on a query of the second storage entity of whether the one or more database logs were deleted from the second storage entity in response to the first command. The log deletion retry component 840 may be configured as or otherwise support a means for transmitting, to the second storage entity and based on the updated log deletion table, a second command to delete one or more of the database logs that were not deleted from the second storage entity in response to the first command.

In some examples, to support updating the log deletion table, the log deletion table manager 835 may be configured as or otherwise support a means for deleting, from the log deletion table, metadata associated with database logs of the one or more database logs that were deleted from the second storage entity in response to the first command.

In some examples, the log deletion table manager 835 may be configured as or otherwise support a means for deleting, from the log deletion table, the metadata associated with the one or more of the database logs that were not deleted based on a second query of the second storage entity indicating that the one or more of the database logs that were not deleted from the second storage entity in response to the first command were deleted from the second storage entity in response to the second command.

In some examples, the metadata associated with the set of database logs includes a set of identifiers associated with the set of database logs, the set of identifiers including a first identifier associated with the backup procedure, a second identifier associated with the second storage entity, a third identifier associated with a beginning database log of the set of database logs, a fourth identifier associated with a last database log of the set of database logs, a fifth identifier associated with a reset instance of the second storage entity, or a combination thereof.

In some examples, the metadata associated with the set of database logs includes a time at which the backup procedure is performed, a date at which the backup procedure is performed, an indication of the user configuration of the second storage entity, or a combination thereof.

In some examples, the second command includes identifiers associated with the one or more of the database logs that were not deleted from the second storage entity in response to the first command and identifiers associated with database logs of the one or more database logs that were deleted from the second storage entity in response to the first command.

In some examples, the user configuration of the second storage entity indicates a retention time period after the backup procedure that the set of database logs are to be stored at the second storage entity, the first command to delete the one or more database logs transmitted after an expiration of the retention time period.

In some examples, the metadata component 825 may be configured as or otherwise support a means for storing metadata associated with a second set of database logs in the log deletion table as part of a second backup procedure for backing up the second set of database logs from the second storage entity to the first storage entity, where the second command is transmitted as part of the second backup procedure.

In some examples, the log deletion table manager 835 may be configured as or otherwise support a means for deleting, from the log deletion table, metadata associated with a database log that was not deleted from the second storage entity in response to the second command based on the metadata associated with the database log being stored in the log deletion table for a threshold period of time.

In some examples, the log deletion component 830 may be configured as or otherwise support a means for transmitting, to the second storage entity, an indication for manual deletion, by a user, of the database log based on the metadata associated with the database log being stored in the log deletion table for the threshold period of time.

In some examples, to support storing the metadata associated with the set of database logs, the metadata component 825 may be configured as or otherwise support a means for storing the metadata associated with the set of database logs in a row of the log deletion table that corresponds to a database associated with the set of database logs and a time period during which the backup procedure is performed.

In some examples, the row of the log deletion table includes respective metadata associated with a set of multiple sets of database logs including the set of database logs, each set of database logs of the set of multiple sets of database logs corresponding to the database and stored as part of a respective backup procedure for backing up a respective set of database logs that is performed within the time period.

In some examples, the log deletion table manager 835 may be configured as or otherwise support a means for deleting the row from the log deletion table based on deleting the respective metadata associated with each of the set of multiple sets of database logs from the log deletion table.

In some examples, the log deletion table is stored at the first storage entity and updated by the first storage entity.

In some examples, the metadata associated with the set of database logs is stored in the log deletion table based on a flag indicating for the storage of the metadata associated with the set of database logs in the log deletion table as part of the backup procedure.

Figure 9:
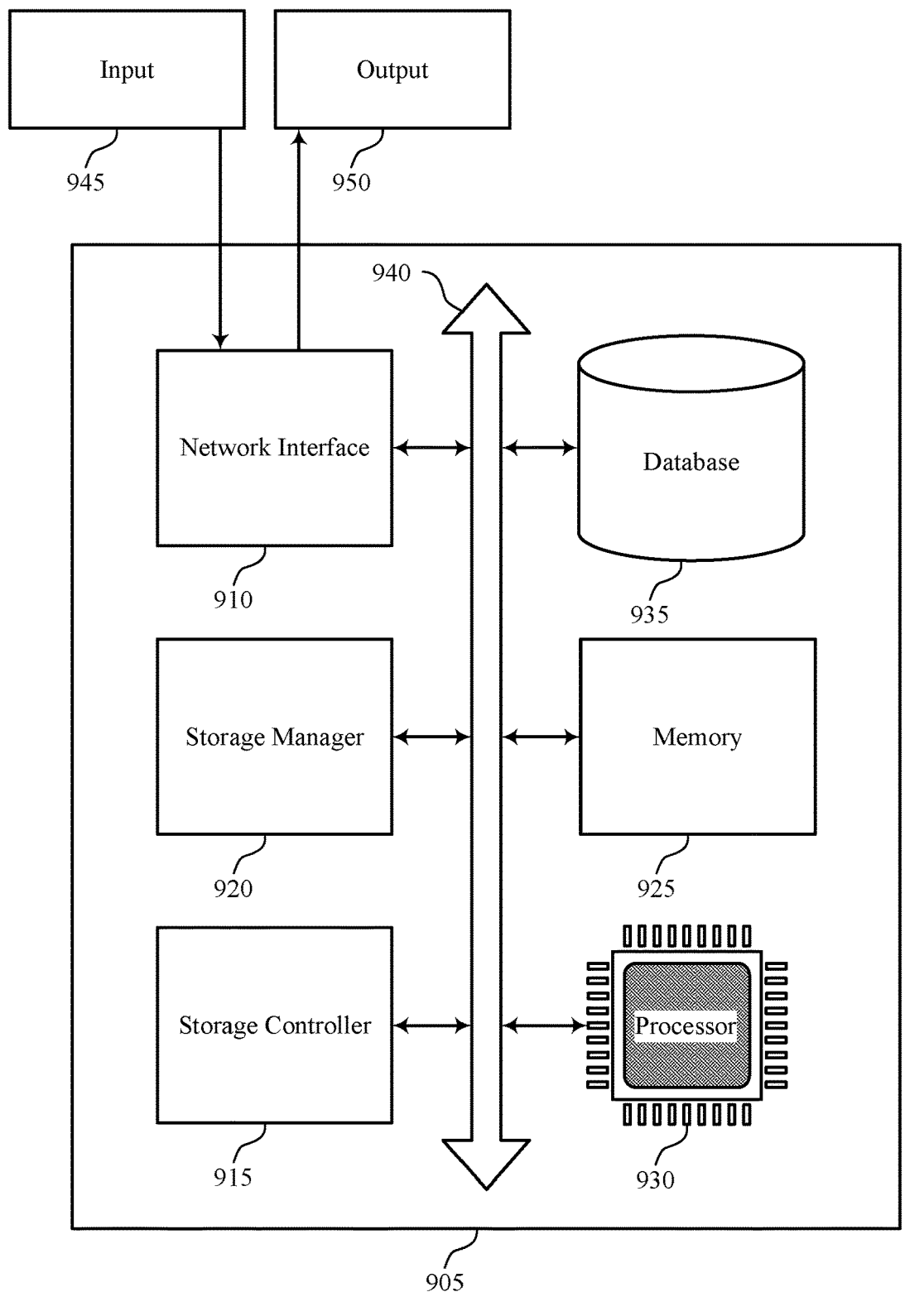
FIG. 9 shows a diagram of a system including a device that supports techniques for archived log deletion in accordance with aspects of the present disclosure.

FIG. 9 shows a diagram of a system 900 including a device 905 that supports techniques for archived log deletion in accordance with aspects of the present disclosure. The device 905 may be an example of or include the components of a device 705 as described herein. The device 905 may include components for bi-directional data communications including components for transmitting and receiving communications, such as a storage manager 920, a network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage peripherals not integrated into the device 905. In some cases, the network interface 910 may represent a physical connection or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include RAM and ROM. The memory 925 may store computer-readable, computer-executable software including instructions that, when executed, cause the processor 930 to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting techniques for archived log deletion).

The storage manager 920 may support data management in accordance with examples as disclosed herein. For example, the storage manager 920 may be configured as or otherwise support a means for storing metadata associated with a set of database logs in a log deletion table as part of a backup procedure for backing up the set of database logs from a second storage entity to a first storage entity. The storage manager 920 may be configured as or otherwise support a means for transmitting, to the second storage entity and in accordance with a user configuration of the second storage entity, a first command to delete one or more database logs of the set of database logs from the second storage entity in accordance with the backup procedure. The storage manager 920 may be configured as or otherwise support a means for updating the log deletion table based on a query of the second storage entity of whether the one or more database logs were deleted from the second storage entity in response to the first command. The storage manager 920 may be configured as or otherwise support a means for transmitting, to the second storage entity and based on the updated log deletion table, a second command to delete one or more of the database logs that were not deleted from the second storage entity in response to the first command.

By including or configuring the storage manager 920 in accordance with examples as described herein, the device 905 may support techniques for deleting database logs from a storage entity that failed to be deleted, thereby reducing or eliminating redundant data storage, increasing available storage of the storage entity, improving storage efficiency, and reducing a frequency of manual deletion of undeleted database logs by a user, among other benefits.

Figure 10:
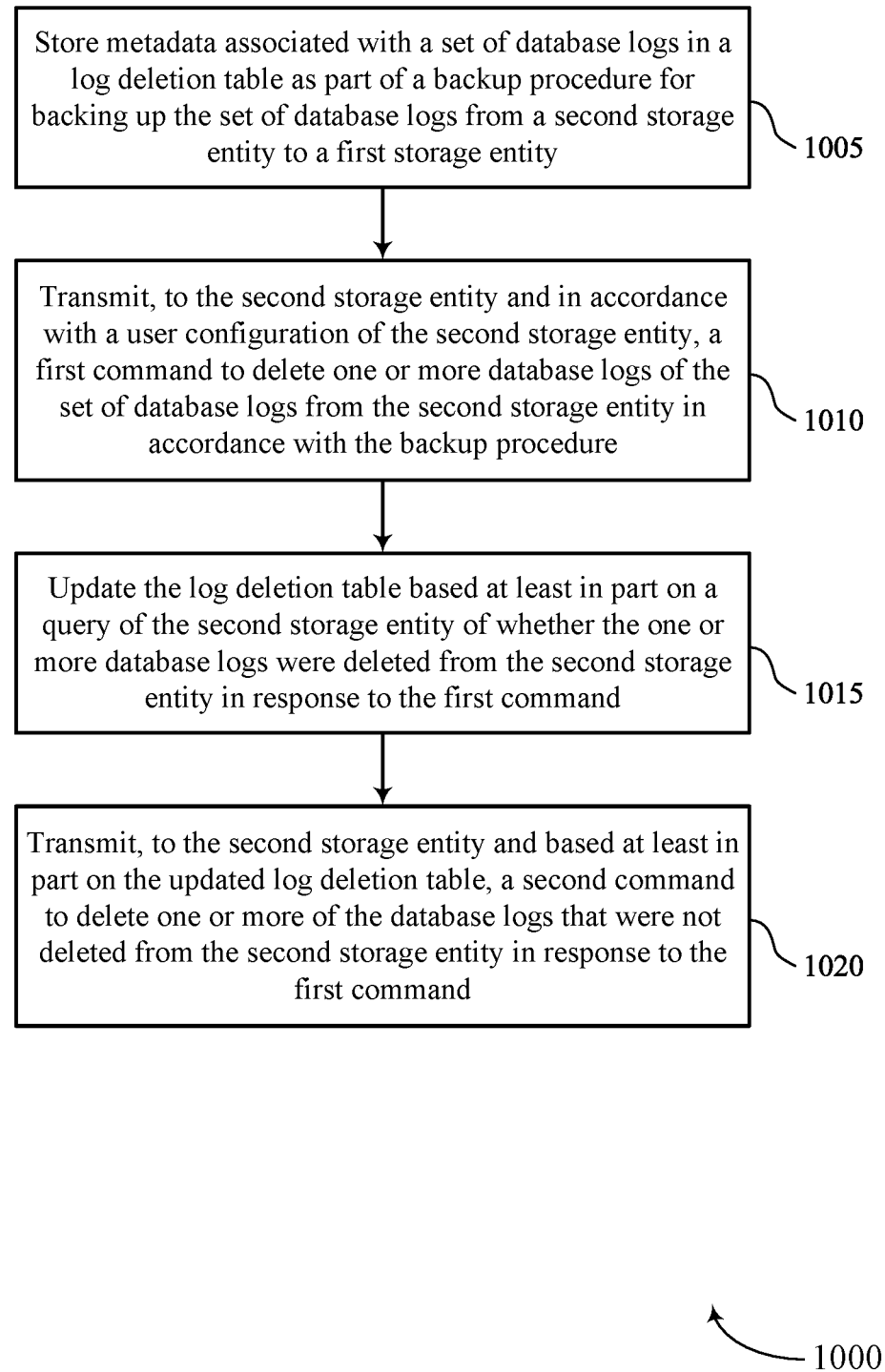
FIGS. 10 through 13 show flowcharts illustrating methods that support techniques for archived log deletion in accordance with aspects of the present disclosure.

FIG. 10 shows a flowchart illustrating a method 1000 that supports techniques for archived log deletion in accordance with aspects of the present disclosure. The operations of the method 1000 may be implemented by a data center or its components as described herein. For example, the operations of the method 1000 may be performed by a data center as described with reference to FIGS. 1 through 9. In some examples, a data center may execute a set of instructions to control the functional elements of the data center to perform the described functions. Additionally, or alternatively, the data center may perform aspects of the described functions using special-purpose hardware.

At 1005, the method may include storing metadata associated with a set of database logs in a log deletion table as part of a backup procedure for backing up the set of database logs from a second storage entity to a first storage entity. The operations of 1005 may be performed in accordance with examples as disclosed herein. In some examples, aspects of the operations of 1005 may be performed by a metadata component 825 as described with reference to FIG. 8.

At 1010, the method may include transmitting, to the second storage entity and in accordance with a user configuration of the second storage entity, a first command to delete one or more database logs of the set of database logs from the second storage entity in accordance with the backup procedure. The operations of 1010 may be performed in accordance with examples as disclosed herein. In some examples, aspects of the operations of 1010 may be performed by a log deletion component 830 as described with reference to FIG. 8.

At 1015, the method may include updating the log deletion table based on a query of the second storage entity of whether the one or more database logs were deleted from the second storage entity in response to the first command. The operations of 1015 may be performed in accordance with examples as disclosed herein. In some examples, aspects of the operations of 1015 may be performed by a log deletion table manager 835 as described with reference to FIG. 8.

At 1020, the method may include transmitting, to the second storage entity and based on the updated log deletion table, a second command to delete one or more of the database logs that were not deleted from the second storage entity in response to the first command. The operations of 1020 may be performed in accordance with examples as disclosed herein. In some examples, aspects of the operations of 1020 may be performed by a log deletion retry component 840 as described with reference to FIG. 8.

Figure 11:
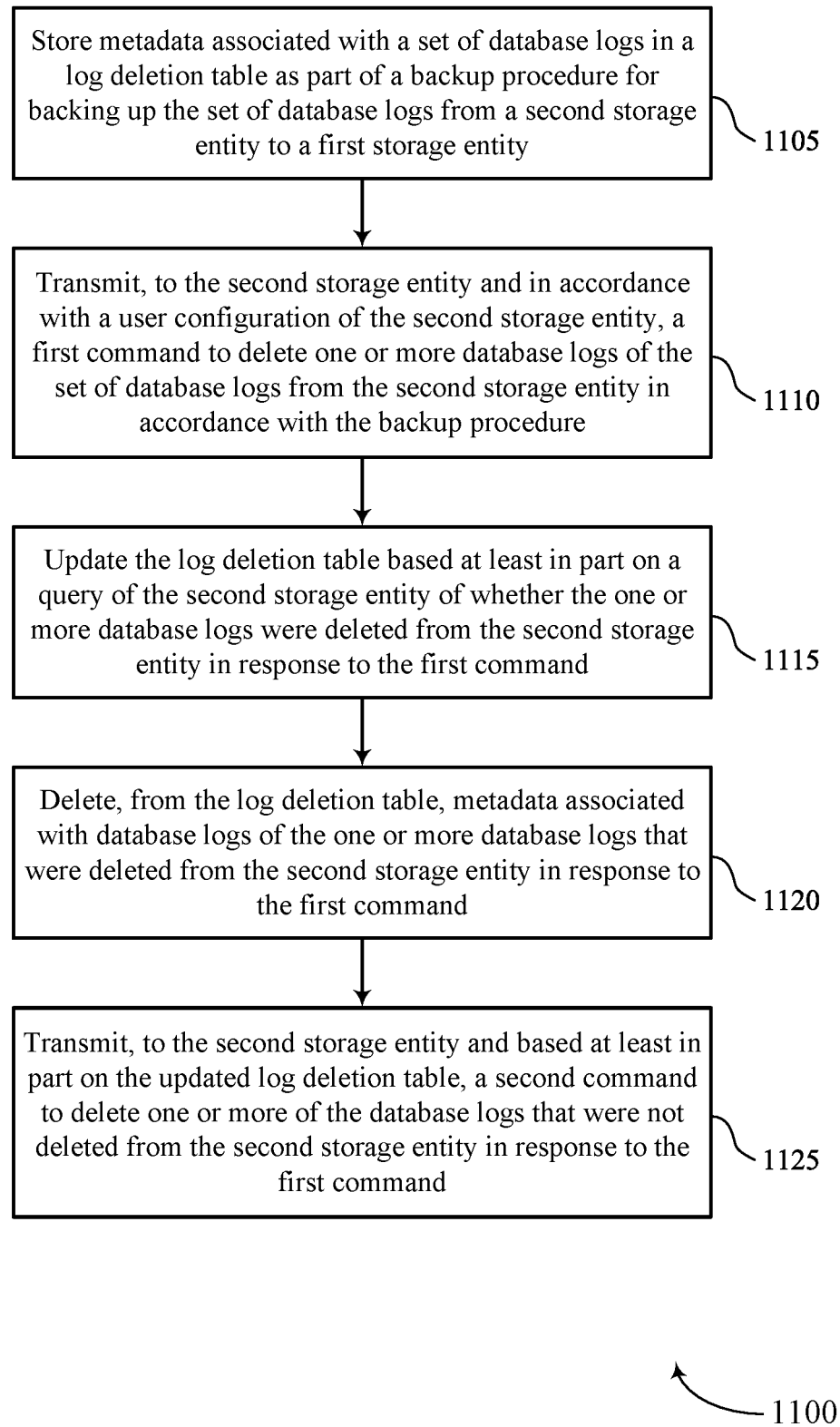

FIG. 11 shows a flowchart illustrating a method 1100 that supports techniques for archived log deletion in accordance with aspects of the present disclosure. The operations of the method 1100 may be implemented by a data center or its components as described herein. For example, the operations of the method 1100 may be performed by a data center as described with reference to FIGS. 1 through 9. In some examples, a data center may execute a set of instructions to control the functional elements of the data center to perform the described functions. Additionally, or alternatively, the data center may perform aspects of the described functions using special-purpose hardware.

At 1105, the method may include storing metadata associated with a set of database logs in a log deletion table as part of a backup procedure for backing up the set of database logs from a second storage entity to a first storage entity. The operations of 1105 may be performed in accordance with examples as disclosed herein. In some examples, aspects of the operations of 1105 may be performed by a metadata component 825 as described with reference to FIG. 8.

At 1110, the method may include transmitting, to the second storage entity and in accordance with a user configuration of the second storage entity, a first command to delete one or more database logs of the set of database logs from the second storage entity in accordance with the backup procedure. The operations of 1110 may be performed in accordance with examples as disclosed herein. In some examples, aspects of the operations of 1110 may be performed by a log deletion component 830 as described with reference to FIG. 8.

At 1115, the method may include updating the log deletion table based on a query of the second storage entity of whether the one or more database logs were deleted from the second storage entity in response to the first command. The operations of 1115 may be performed in accordance with examples as disclosed herein. In some examples, aspects of the operations of 1115 may be performed by a log deletion table manager 835 as described with reference to FIG. 8.

At 1120, to update the log deletion table, the method may include deleting, from the log deletion table, metadata associated with database logs of the one or more database logs that were deleted from the second storage entity in response to the first command. The operations of 1120 may be performed in accordance with examples as disclosed herein. In some examples, aspects of the operations of 1120 may be performed by a log deletion table manager 835 as described with reference to FIG. 8.

At 1125, the method may include transmitting, to the second storage entity and based on the updated log deletion table, a second command to delete one or more of the database logs that were not deleted from the second storage entity in response to the first command. The operations of 1125 may be performed in accordance with examples as disclosed herein. In some examples, aspects of the operations of 1125 may be performed by a log deletion retry component 840 as described with reference to FIG. 8.

Figure 12:
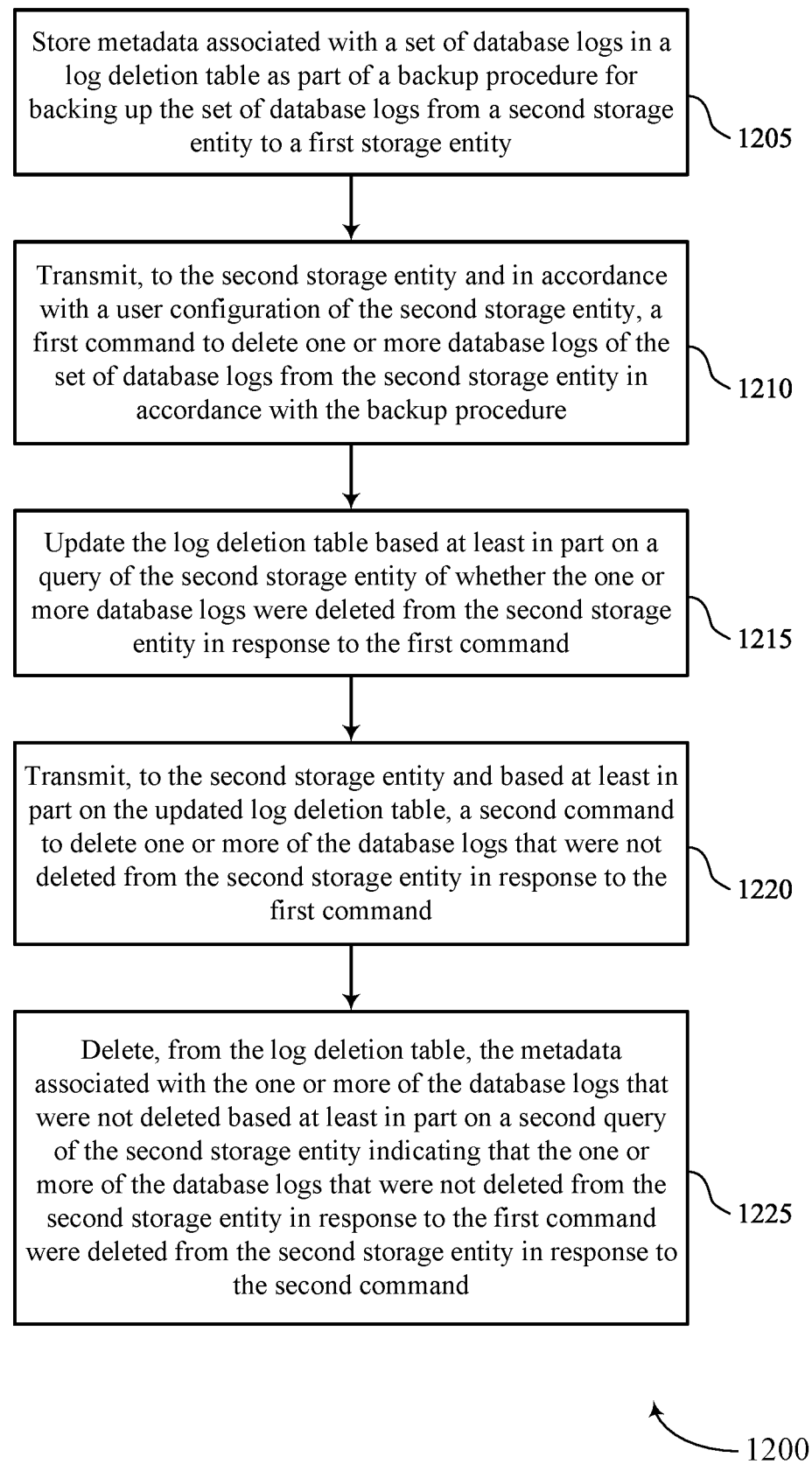

FIG. 12 shows a flowchart illustrating a method 1200 that supports techniques for archived log deletion in accordance with aspects of the present disclosure. The operations of the method 1200 may be implemented by a data center or its components as described herein. For example, the operations of the method 1200 may be performed by a data center as described with reference to FIGS. 1 through 9. In some examples, a data center may execute a set of instructions to control the functional elements of the data center to perform the described functions. Additionally, or alternatively, the data center may perform aspects of the described functions using special-purpose hardware.

At 1205, the method may include storing metadata associated with a set of database logs in a log deletion table as part of a backup procedure for backing up the set of database logs from a second storage entity to a first storage entity. The operations of 1205 may be performed in accordance with examples as disclosed herein. In some examples, aspects of the operations of 1205 may be performed by a metadata component 825 as described with reference to FIG. 8.

At 1210, the method may include transmitting, to the second storage entity and in accordance with a user configuration of the second storage entity, a first command to delete one or more database logs of the set of database logs from the second storage entity in accordance with the backup procedure. The operations of 1210 may be performed in accordance with examples as disclosed herein. In some examples, aspects of the operations of 1210 may be performed by a log deletion component 830 as described with reference to FIG. 8.

At 1215, the method may include updating the log deletion table based on a query of the second storage entity of whether the one or more database logs were deleted from the second storage entity in response to the first command. The operations of 1215 may be performed in accordance with examples as disclosed herein. In some examples, aspects of the operations of 1215 may be performed by a log deletion table manager 835 as described with reference to FIG. 8.

At 1220, the method may include transmitting, to the second storage entity and based on the updated log deletion table, a second command to delete one or more of the database logs that were not deleted from the second storage entity in response to the first command. The operations of 1220 may be performed in accordance with examples as disclosed herein. In some examples, aspects of the operations of 1220 may be performed by a log deletion retry component 840 as described with reference to FIG. 8.

At 1225, the method may include deleting, from the log deletion table, the metadata associated with the one or more of the database logs that were not deleted based on a second query of the second storage entity indicating that the one or more of the database logs that were not deleted from the second storage entity in response to the first command were deleted from the second storage entity in response to the second command. The operations of 1225 may be performed in accordance with examples as disclosed herein. In some examples, aspects of the operations of 1225 may be performed by a log deletion table manager 835 as described with reference to FIG. 8.

Figure 13:
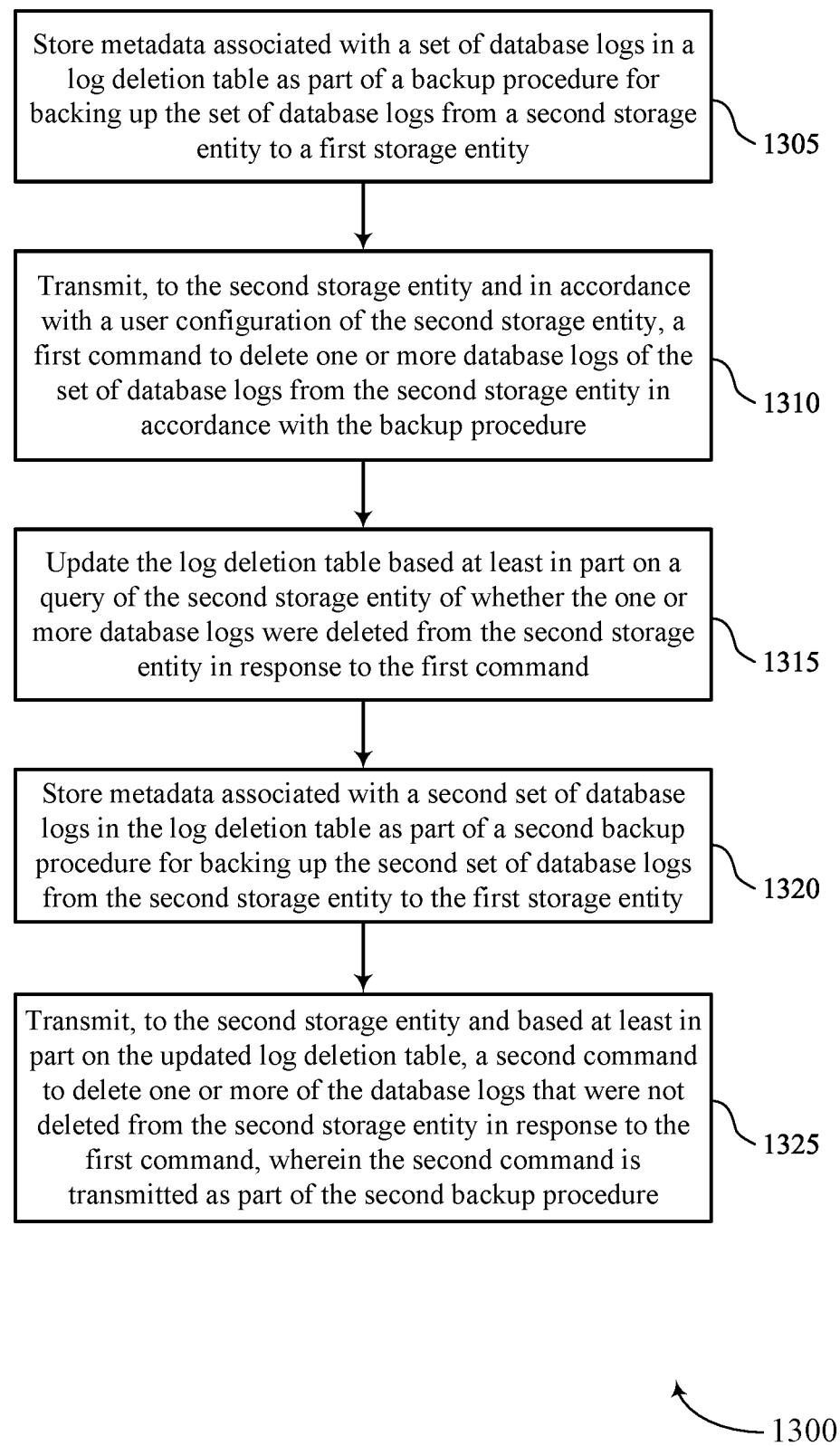

FIG. 13 shows a flowchart illustrating a method 1300 that supports techniques for archived log deletion in accordance with aspects of the present disclosure. The operations of the method 1300 may be implemented by a data center or its components as described herein. For example, the operations of the method 1300 may be performed by a data center as described with reference to FIGS. 1 through 9. In some examples, a data center may execute a set of instructions to control the functional elements of the data center to perform the described functions. Additionally, or alternatively, the data center may perform aspects of the described functions using special-purpose hardware.

At 1305, the method may include storing metadata associated with a set of database logs in a log deletion table as part of a backup procedure for backing up the set of database logs from a second storage entity to a first storage entity. The operations of 1305 may be performed in accordance with examples as disclosed herein. In some examples, aspects of the operations of 1305 may be performed by a metadata component 825 as described with reference to FIG. 8.

At 1310, the method may include transmitting, to the second storage entity and in accordance with a user configuration of the second storage entity, a first command to delete one or more database logs of the set of database logs from the second storage entity in accordance with the backup procedure. The operations of 1310 may be performed in accordance with examples as disclosed herein. In some examples, aspects of the operations of 1310 may be performed by a log deletion component 830 as described with reference to FIG. 8.

At 1315, the method may include updating the log deletion table based on a query of the second storage entity of whether the one or more database logs were deleted from the second storage entity in response to the first command. The operations of 1315 may be performed in accordance with examples as disclosed herein. In some examples, aspects of the operations of 1315 may be performed by a log deletion table manager 835 as described with reference to FIG. 8.

At 1320, the method may include storing metadata associated with a second set of database logs in the log deletion table as part of a second backup procedure for backing up the second set of database logs from the second storage entity to the first storage entity. The operations of 1320 may be performed in accordance with examples as disclosed herein. In some examples, aspects of the operations of 1320 may be performed by a metadata component 825 as described with reference to FIG. 8.

At 1325, the method may include transmitting, to the second storage entity and based on the updated log deletion table, a second command to delete one or more of the database logs that were not deleted from the second storage entity in response to the first command, where the second command is transmitted as part of the second backup procedure. The operations of 1325 may be performed in accordance with examples as disclosed herein. In some examples, aspects of the operations of 1325 may be performed by a log deletion retry component 840 as described with reference to FIG. 8.

A method for data management is described. The method may include storing metadata associated with a set of database logs in a log deletion table as part of a backup procedure for backing up the set of database logs from a second storage entity to a first storage entity, transmitting, to the second storage entity and in accordance with a user configuration of the second storage entity, a first command to delete one or more database logs of the set of database logs from the second storage entity in accordance with the backup procedure, updating the log deletion table based on a query of the second storage entity of whether the one or more database logs were deleted from the second storage entity in response to the first command, and transmitting, to the second storage entity and based on the updated log deletion table, a second command to delete one or more of the database logs that were not deleted from the second storage entity in response to the first command.

An apparatus for data management is described. The apparatus may include a processor, memory coupled with the processor, and instructions stored in the memory. The instructions may be executable by the processor to cause the apparatus to store metadata associated with a set of database logs in a log deletion table as part of a backup procedure for backing up the set of database logs from a second storage entity to a first storage entity, transmit, to the second storage entity and in accordance with a user configuration of the second storage entity, a first command to delete one or more database logs of the set of database logs from the second storage entity in accordance with the backup procedure, update the log deletion table based on a query of the second storage entity of whether the one or more database logs were deleted from the second storage entity in response to the first command, and transmit, to the second storage entity and based on the updated log deletion table, a second command to delete one or more of the database logs that were not deleted from the second storage entity in response to the first command.

Another apparatus for data management is described. The apparatus may include means for storing metadata associated with a set of database logs in a log deletion table as part of a backup procedure for backing up the set of database logs from a second storage entity to a first storage entity, means for transmitting, to the second storage entity and in accordance with a user configuration of the second storage entity, a first command to delete one or more database logs of the set of database logs from the second storage entity in accordance with the backup procedure, means for updating the log deletion table based on a query of the second storage entity of whether the one or more database logs were deleted from the second storage entity in response to the first command, and means for transmitting, to the second storage entity and based on the updated log deletion table, a second command to delete one or more of the database logs that were not deleted from the second storage entity in response to the first command.

A non-transitory computer-readable medium storing code for data management is described. The code may include instructions executable by a processor to store metadata associated with a set of database logs in a log deletion table as part of a backup procedure for backing up the set of database logs from a second storage entity to a first storage entity, transmit, to the second storage entity and in accordance with a user configuration of the second storage entity, a first command to delete one or more database logs of the set of database logs from the second storage entity in accordance with the backup procedure, update the log deletion table based on a query of the second storage entity of whether the one or more database logs were deleted from the second storage entity in response to the first command, and transmit, to the second storage entity and based on the updated log deletion table, a second command to delete one or more of the database logs that were not deleted from the second storage entity in response to the first command.

In some examples of the method, apparatuses, and non-transitory computer-readable medium described herein, updating the log deletion table may include operations, features, means, or instructions for deleting, from the log deletion table, metadata associated with database logs of the one or more database logs that were deleted from the second storage entity in response to the first command.

Some examples of the method, apparatuses, and non-transitory computer-readable medium described herein may further include operations, features, means, or instructions for deleting, from the log deletion table, the metadata associated with the one or more of the database logs that were not deleted based on a second query of the second storage entity indicating that the one or more of the database logs that were not deleted from the second storage entity in response to the first command were deleted from the second storage entity in response to the second command.

In some examples of the method, apparatuses, and non-transitory computer-readable medium described herein, the metadata associated with the set of database logs includes a set of identifiers associated with the set of database logs, the set of identifiers including a first identifier associated with the backup procedure, a second identifier associated with the second storage entity, a third identifier associated with a beginning database log of the set of database logs, a fourth identifier associated with a last database log of the set of database logs, a fifth identifier associated with a reset instance of the second storage entity, or a combination thereof.

In some examples of the method, apparatuses, and non-transitory computer-readable medium described herein, the metadata associated with the set of database logs includes a time at which the backup procedure may be performed, a date at which the backup procedure may be performed, an indication of the user configuration of the second storage entity, or a combination thereof.

In some examples of the method, apparatuses, and non-transitory computer-readable medium described herein, the second command includes identifiers associated with the one or more of the database logs that were not deleted from the second storage entity in response to the first command and identifiers associated with database logs of the one or more database logs that were deleted from the second storage entity in response to the first command.

In some examples of the method, apparatuses, and non-transitory computer-readable medium described herein, the user configuration of the second storage entity indicates a retention time period after the backup procedure that the set of database logs are to be stored at the second storage entity, the first command to delete the one or more database logs transmitted after an expiration of the retention time period.

Some examples of the method, apparatuses, and non-transitory computer-readable medium described herein may further include operations, features, means, or instructions for storing metadata associated with a second set of database logs in the log deletion table as part of a second backup procedure for backing up the second set of database logs from the second storage entity to the first storage entity, where the second command may be transmitted as part of the second backup procedure.

Some examples of the method, apparatuses, and non-transitory computer-readable medium described herein may further include operations, features, means, or instructions for deleting, from the log deletion table, metadata associated with a database log that was not deleted from the second storage entity in response to the second command based on the metadata associated with the database log being stored in the log deletion table for a threshold period of time.

Some examples of the method, apparatuses, and non-transitory computer-readable medium described herein may further include operations, features, means, or instructions for transmitting, to the second storage entity, an indication for manual deletion, by a user, of the database log based on the metadata associated with the database log being stored in the log deletion table for the threshold period of time.

In some examples of the method, apparatuses, and non-transitory computer-readable medium described herein, storing the metadata associated with the set of database logs may include operations, features, means, or instructions for storing the metadata associated with the set of database logs in a row of the log deletion table that corresponds to a database associated with the set of database logs and a time period during which the backup procedure may be performed.

In some examples of the method, apparatuses, and non-transitory computer-readable medium described herein, the row of the log deletion table includes respective metadata associated with a set of multiple sets of database logs including the set of database logs, each set of database logs of the set of multiple sets of database logs corresponding to the database and stored as part of a respective backup procedure for backing up a respective set of database logs that may be performed within the time period.

Some examples of the method, apparatuses, and non-transitory computer-readable medium described herein may further include operations, features, means, or instructions for deleting the row from the log deletion table based on deleting the respective metadata associated with each of the set of multiple sets of database logs from the log deletion table.

In some examples of the method, apparatuses, and non-transitory computer-readable medium described herein, the log deletion table may be stored at the first storage entity and updated by the first storage entity.

In some examples of the method, apparatuses, and non-transitory computer-readable medium described herein, the metadata associated with the set of database logs may be stored in the log deletion table based on a flag indicating for the storage of the metadata associated with the set of database logs in the log deletion table as part of the backup procedure.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management, comprising:
   storing metadata associated with a set of database logs in a log deletion table as part of a backup procedure for backing up the set of database logs from a second storage entity to a first storage entity;
   transmitting, to the second storage entity and in accordance with a user configuration of the second storage entity, a first command to delete one or more database logs of the set of database logs from the second storage entity in accordance with the backup procedure;
   transmitting a query to the second storage entity to determine whether the one or more database logs were deleted from the second storage entity in response to the first command;
   updating the log deletion table based at least in part on the query of the second storage entity, wherein updating the log deletion table is based at least in part on determining that at least one database log of whether the one or more database logs was not deleted from the second storage entity in response to the first command; and
   transmitting, to the second storage entity and based at least in part on the updated log deletion table, a second command to delete the at least one database log of the one or more database logs that was not deleted from the second storage entity in response to the first command.

2. The method of claim 1, wherein updating the log deletion table comprises:
   deleting, from the log deletion table, metadata associated with database logs of the one or more database logs that were deleted from the second storage entity in response to the first command.

3. The method of claim 1, further comprising:
   deleting, from the log deletion table, the metadata associated with the at least one database log of the one or more database logs that was not deleted based at least in part on a second query of the second storage entity indicating that the at least one database log of the one or more database logs that was not deleted from the second storage entity in response to the first command was deleted from the second storage entity in response to the second command.

4. The method of claim 1, wherein the metadata associated with the set of database logs comprises a set of identifiers associated with the set of database logs, the set of identifiers comprising a first identifier associated with the backup procedure, a second identifier associated with the second storage entity, a third identifier associated with a beginning database log of the set of database logs, a fourth identifier associated with a last database log of the set of database logs, a fifth identifier associated with a reset instance of the second storage entity, or a combination thereof.

5. The method of claim 1, wherein the metadata associated with the set of database logs comprises a time at which the backup procedure is performed, a date at which the backup procedure is performed, an indication of the user configuration of the second storage entity, or a combination thereof.

6. The method of claim 1, wherein the second command comprises an identifier associated with the at least one database log of the one or more database logs that was not deleted from the second storage entity in response to the first command and identifiers associated with database logs of the one or more database logs that were deleted from the second storage entity in response to the first command.

7. The method of claim 1, wherein the user configuration of the second storage entity indicates a retention time period after the backup procedure that the set of database logs are to be stored at the second storage entity, the first command to delete the one or more database logs transmitted after an expiration of the retention time period.

8. The method of claim 1, further comprising:
storing metadata associated with a second set of database logs in the log deletion table as part of a second backup procedure for backing up the second set of database logs from the second storage entity to the first storage entity, wherein the second command is transmitted as part of the second backup procedure.

9. The method of claim 1, further comprising:
deleting, from the log deletion table, metadata associated with a database log that was not deleted from the second storage entity in response to the second command based at least in part on the metadata associated with the database log being stored in the log deletion table for a threshold period of time.

10. The method of claim 9, further comprising:
transmitting, to the second storage entity, an indication for manual deletion, by a user, of the database log based at least in part on the metadata associated with the database log being stored in the log deletion table for the threshold period of time.

11. The method of claim 1, wherein storing the metadata associated with the set of database logs comprises:
storing the metadata associated with the set of database logs in a row of the log deletion table that corresponds to a database associated with the set of database logs and a time period during which the backup procedure is performed.

12. The method of claim 11, wherein the row of the log deletion table comprises respective metadata associated with a plurality of sets of database logs comprising the set of database logs, each set of database logs of the plurality of sets of database logs corresponding to the database and stored as part of a respective backup procedure for backing up a respective set of database logs that is performed within the time period.

13. The method of claim 12, further comprising:
deleting the row from the log deletion table based at least in part on deleting the respective metadata associated with each of the plurality of sets of database logs from the log deletion table.

14. The method of claim 1, wherein the log deletion table is stored at the first storage entity and updated by the first storage entity.

15. The method of claim 1, wherein the metadata associated with the set of database logs is stored in the log deletion table based at least in part on a flag indicating for the storage of the metadata associated with the set of database logs in the log deletion table as part of the backup procedure.

16. An apparatus for data management, comprising:
a processor;
memory coupled with the processor; and
instructions stored in the memory and executable by the processor to cause the apparatus to:
store metadata associated with a set of database logs in a log deletion table as part of a backup procedure for backing up the set of database logs from a second storage entity to a first storage entity;
transmit, to the second storage entity and in accordance with a user configuration of the second storage entity, a first command to delete one or more database logs of the set of database logs from the second storage entity in accordance with the backup procedure;
transmit a query to the second storage entity to determine whether the one or more database logs were deleted from the second storage entity in response to the first command;
update the log deletion table based at least in part on the query of the second storage entity, wherein updating the log deletion table is based at least in part on determining that at least one database log of the one or more database logs was not deleted from the second storage entity in response to the first command; and
transmit, to the second storage entity and based at least in part on the updated log deletion table, a second command to delete the at least one database log of the one or more database logs that was not deleted from the second storage entity in response to the first command.

17. The apparatus of claim 16, wherein the instructions to update the log deletion table are executable by the processor to cause the apparatus to:
delete, from the log deletion table, metadata associated with database logs of the one or more database logs that were deleted from the second storage entity in response to the first command.

18. The apparatus of claim 16, wherein the instructions are further executable by the processor to cause the apparatus to:
delete, from the log deletion table, the metadata associated with the at least one database log of the one or more database logs that was not deleted based at least in part on a second query of the second storage entity indicating that the at least one database log of the one or more database logs that was not deleted from the second storage entity in response to the first command was deleted from the second storage entity in response to the second command.

19. The apparatus of claim 16, wherein the metadata associated with the set of database logs comprises a set of identifiers associated with the set of database logs, the set of identifiers comprising a first identifier associated with the backup procedure, a second identifier associated with the second storage entity, a third identifier associated with a beginning database log of the set of database logs, a fourth identifier associated with a last database log of the set of database logs, a fifth identifier associated with a reset instance of the second storage entity, or a combination thereof.

20. The apparatus of claim 16, wherein the metadata associated with the set of database logs comprises a time at which the backup procedure is performed, a date at which the backup procedure is performed, an indication of the user configuration of the second storage entity, or a combination thereof.

21. The apparatus of claim 16, wherein the second command comprises an identifier associated with the at least one database log of the one or more database logs that was not deleted from the second storage entity in response to the first command and identifiers associated with database logs of the one or more database logs that were deleted from the second storage entity in response to the first command.

22. The apparatus of claim 16, wherein the user configuration of the second storage entity indicates a retention time period after the backup procedure that the set of database logs are to be stored at the second storage entity, the first command to delete the one or more database logs transmitted after an expiration of the retention time period.

23. The apparatus of claim 16, wherein the instructions are further executable by the processor to cause the apparatus to:
- store metadata associated with a second set of database logs in the log deletion table as part of a second backup procedure for backing up the second set of database logs from the second storage entity to the first storage entity, wherein the second command is transmitted as part of the second backup procedure.

24. The apparatus of claim 16, wherein the instructions are further executable by the processor to cause the apparatus to:
- delete, from the log deletion table, metadata associated with a database log that was not deleted from the second storage entity in response to the second command based at least in part on the metadata associated with the database log being stored in the log deletion table for a threshold period of time.

25. The apparatus of claim 24, wherein the instructions are further executable by the processor to cause the apparatus to:
- transmit, to the second storage entity, an indication for manual deletion, by a user, of the database log based at least in part on the metadata associated with the database log being stored in the log deletion table for the threshold period of time.

26. The apparatus of claim 16, wherein the instructions to store the metadata associated with the set of database logs are executable by the processor to cause the apparatus to:
- store the metadata associated with the set of database logs in a row of the log deletion table that corresponds to a database associated with the set of database logs and a time period during which the backup procedure is performed.

27. The apparatus of claim 26, wherein the row of the log deletion table comprises respective metadata associated with a plurality of sets of database logs comprising the set of database logs, each set of database logs of the plurality of sets of database logs corresponding to the database and stored as part of a respective backup procedure for backing up a respective set of database logs that is performed within the time period.

28. The apparatus of claim 27, wherein the instructions are further executable by the processor to cause the apparatus to:
- delete the row from the log deletion table based at least in part on deleting the respective metadata associated with each of the plurality of sets of database logs from the log deletion table.

29. A non-transitory computer-readable medium storing code for data management, the code comprising instructions executable by a processor to:
- store metadata associated with a set of database logs in a log deletion table as part of a backup procedure for backing up the set of database logs from a second storage entity to a first storage entity;
- transmit, to the second storage entity and in accordance with a user configuration of the second storage entity, a first command to delete one or more database logs of the set of database logs from the second storage entity in accordance with the backup procedure;
- transmit a query to the second storage entity to determine whether the one or more database logs were deleted from the second storage entity in response to the first command;
- update the log deletion table based at least in part on the query of the second storage entity, wherein updating the log deletion table is based at least in part on determining that at least one database log of the one or more database logs was not deleted from the second storage entity in response to the first command; and
- transmit, to the second storage entity and based at least in part on the updated log deletion table, a second command to delete the at least one database log of the one or more database logs that was not deleted from the second storage entity in response to the first command.

* * * * *